United States Patent
Yan et al.

(10) Patent No.: US 11,153,858 B2
(45) Date of Patent: Oct. 19, 2021

(54) UPLINK COMMUNICATION METHOD, TERMINAL DEVICE, AND NETWORK DEVICE

(71) Applicant: HUAWEI TECHNOLOGIES CO., LTD., Guangdong (CN)

(72) Inventors: Zhiyu Yan, Shenzhen (CN); Yongxia Lyu, Ottawa (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 74 days.

(21) Appl. No.: 16/579,480

(22) Filed: Sep. 23, 2019

(65) Prior Publication Data
US 2020/0045693 A1 Feb. 6, 2020

Related U.S. Application Data
(63) Continuation of application No. PCT/CN2018/080236, filed on Mar. 23, 2018.

(30) Foreign Application Priority Data
Mar. 24, 2017 (CN) .......................... 201710184369.6

(51) Int. Cl.
*H04W 72/04* (2009.01)
*H04L 5/00* (2006.01)
(Continued)

(52) U.S. Cl.
CPC ....... *H04W 72/0413* (2013.01); *H04L 5/0053* (2013.01); *H04W 72/042* (2013.01);
(Continued)

(58) Field of Classification Search
CPC .......... H04W 72/0413; H04W 72/042; H04W 72/0453; H04W 72/1257; H04W 72/14; H04W 72/1268; H04L 5/0053
See application file for complete search history.

(56) References Cited

U.S. PATENT DOCUMENTS

| 2011/0188594 A1* | 8/2011 | Kim | ..................... H04L 1/0073 375/260 |
|---|---|---|---|
| 2011/0274099 A1 | 11/2011 | Kwon et al. | |

(Continued)

FOREIGN PATENT DOCUMENTS

| CN | 102224698 A | 10/2011 |
|---|---|---|
| CN | 103220690 A | 7/2013 |

(Continued)

*Primary Examiner* — Farid Seyedvosoghi
(74) *Attorney, Agent, or Firm* — Womble Bond Dickinson (US) LLP

(57) ABSTRACT

An uplink communication method is disclosed, so that a network device can control an uplink communication latency, reliability, and uplink transmit power in an uplink grant free communication scenario. The method includes: obtaining, by a terminal device, a first control channel, where the first control channel carries a control information group, the control information group includes a plurality of pieces of control information, and the plurality of pieces of control information correspond to a plurality of uplink channels; obtaining, by the terminal device, first control information from the first control channel, where the first control information is control information corresponding to a first uplink channel in the plurality of uplink channels; and performing, by the terminal device, uplink communication with a network device based on the first control information.

20 Claims, 6 Drawing Sheets

| Field #1 (2 bits) | Field #2 (2 bits) | Field #3 (2 bits) | Field #4 (2 bits) |
|---|---|---|---|
| Time-frequency resource #1, and uplink channel control information #1 corresponding to an RS 1 | Time-frequency resource #1, and uplink channel control information #2 corresponding to an RS 2 | Time-frequency resource #1, and uplink channel control information #3 corresponding to an RS 3 | Time-frequency resource #1, and uplink channel control information #4 corresponding to an RS 4 |

Control information group (8 bits)

(51) Int. Cl.
*H04W 72/12* (2009.01)
*H04W 72/14* (2009.01)

(52) U.S. Cl.
CPC ... *H04W 72/0453* (2013.01); *H04W 72/1257* (2013.01); *H04W 72/14* (2013.01)

(56) References Cited

U.S. PATENT DOCUMENTS

| | | | | |
|---|---|---|---|---|
| 2012/0252447 | A1* | 10/2012 | Sartori | H04W 24/10 455/434 |
| 2015/0029989 | A1 | 1/2015 | Shiizaki et al. | |
| 2015/0333854 | A1* | 11/2015 | Yang | H04B 17/373 370/252 |
| 2015/0341866 | A1 | 11/2015 | Park et al. | |
| 2016/0037492 | A1* | 2/2016 | Xu | H04L 5/14 370/280 |
| 2016/0295577 | A1* | 10/2016 | Harrison | H04W 72/0413 |
| 2017/0339648 | A1 | 11/2017 | Wang et al. | |

FOREIGN PATENT DOCUMENTS

| | | |
|---|---|---|
| CN | 105578580 A | 5/2016 |
| CN | 106507486 A | 3/2017 |
| EP | 2410804 A1 | 1/2012 |
| EP | 2945312 A1 | 11/2015 |
| WO | 2009120888 A2 | 10/2009 |
| WO | 2015007332 A1 | 1/2015 |

* cited by examiner

UPLINK COMMUNICATION METHOD, TERMINAL DEVICE, AND NETWORK DEVICE

CROSS-REFERENCE TO RELATED APPLICATIONS

This application is continuation application of International Application No. PCT/CN2018/080236, filed on Mar. 23, 2018, which claims priority to Chinese Patent Application No. 201710184369.6, filed on Mar. 24, 2017. The disclosures of the aforementioned applications are hereby incorporated by reference in their entireties.

TECHNICAL FIELD

The present disclosure relates to the communications field, and more specifically, to an uplink communication method, a terminal device, and a network device.

BACKGROUND

In a long term evolution (LTE) wireless communications system, uplink data transmission is based on scheduling. Two manners, namely, dynamic scheduling and semi-persistent scheduling are mainly included. In the dynamic scheduling manner, when needing to transmit uplink data, a terminal device first sends a scheduling request to a network device. After receiving the scheduling request, the network device allocates, to the terminal device, a resource used to transmit the uplink data, and indicates the resource to the terminal device by using control signaling. Subsequently, the terminal device sends the uplink data on the resource allocated by the network device to the terminal device. In the semi-persistent scheduling manner, the network device uses a manner of "one allocation and multiple use", instead of indicating, to the terminal device each time, a resource used for current uplink transmission. Compared with the dynamic scheduling manner, the semi-persistent scheduling manner reduces a large quantity of signaling overheads. In LTE, uplink data transmission is based on scheduling, and therefore, the network device has an expectation on specific terminal devices that send uplink data within a time period. In other words, the network device learns of terminal devices that perform uplink transmission within a time period.

In an uplink data transmission process, transmission reliability, transmission latency, and uplink power control is very important. Uplink power control is used as an example. Through the uplink power control, the terminal device can ensure quality of uplink data transmission, and can reduce interference to another terminal device in a system. In addition, through the uplink power control, the network device can enable uplink transmission to adapt to different wireless transmission environments, for example, a path loss, a shadow, and fast fading. In the prior art, the network device adds control information to dynamic scheduling signaling and sends the dynamic scheduling signaling to the terminal device, to control uplink data transmission. Alternatively, in the prior art, to further reduce signaling and time overheads, the network device configures terminal devices sending uplink data within a same time period as a terminal device group, and sends the control information to all terminal devices in one group through one control channel.

However, with continuous development of communications technologies, in a next generation communications system, an ultra-reliable and low latency communications (URLLC) technology becomes one of future data transmission trends. In addition, using a grant free band resource for data transmission is also one of the future data transmission trends. Corresponding coexistence specifications of a 5 GHz grant free band resource include transmit power control (TPC), dynamic frequency selection (DFS), occupied channel bandwidth, listen before talk (LBT), and the like. Using LBT as an example, if uplink data is transmitted on a grant free band resource, the terminal device and the network device both need to contend for a grant free spectrum resource through LBT. When LBT needs to be performed more times, transmission of the uplink data is more difficult.

Uplink grant free (UL grant free) data transmission can effectively meet requirements of the URLLC technology for data transmission reliability and a low latency. In a UL grant free technology, the uplink data transmission of the terminal device no longer depends on a dynamic notification of the network device. Instead, the network device sends preconfiguration information to the terminal device to configure, for the terminal device, a resource for sending uplink data in UL grant free. When the terminal device transmits the uplink data by using the UL grant free technology, the network device neither learns of specific terminal devices that need to send uplink data within a time period, nor learns of a size of uplink data that needs to be sent by a terminal device.

Therefore, in a UL grant free communication scenario, how a network device controls an uplink data transmission latency, reliability, and uplink transmit power becomes a problem urgently needing to be resolved in a future communications technology.

SUMMARY

The present disclosure provides an uplink communication method, so that a network device can control an uplink data transmission latency, reliability, uplink transmit power, and the like in an uplink grant free communication scenario.

According to a first aspect, an embodiment of the present disclosure provides an uplink communication method. The method includes: obtaining, by a terminal device, a first control channel, where the first control channel carries a control information group, the control information group includes a plurality of pieces of control information, and the plurality of pieces of control information correspond to a plurality of uplink channels; obtaining, by the terminal device, first control information from the first control channel, where the first control information is control information corresponding to a first uplink channel in the plurality of uplink channels; and performing, by the terminal device, uplink communication with a network device based on the first control information.

In one embodiment, before the obtaining, by a terminal device, a first control channel, the method further includes: sending, by the terminal device, a signal to the network device by using the first uplink channel.

In one embodiment, the first control channel carries information obtained after joint coding is performed on the plurality of pieces of control information.

In one embodiment, the first uplink channel is an uplink channel configured by the network device for the terminal device.

In one embodiment, the method further includes: receiving, by the terminal device, configuration information sent by the network device, where the configuration information is used to indicate at least one of a time-domain position occupied by the first uplink channel, a frequency-domain position occupied by the first uplink channel, and a reference signal used when the terminal device performs uplink communication on the first uplink channel; or the configuration information is used to indicate a sequence number of the first uplink channel in the plurality of uplink channels or an index of the first uplink channel; or the configuration information includes group identifier information of the terminal device, and the group identifier information corresponds to the first uplink channel.

In one embodiment, the method further includes: obtaining, by the terminal device, the first uplink channel based on the configuration information.

In one embodiment, the control information group includes a plurality of bits, the plurality of bits are grouped into a plurality of bit sets, each bit set includes at least one bit, and each bit set is used to indicate one of the plurality of pieces of control information; or the control information group includes a plurality of bits, the plurality of bits include M valid values, and each valid value corresponds to a combination of the plurality of pieces of control information.

In one embodiment, positions of the plurality of bit sets in the control information group correspond to the plurality of uplink channels.

In one embodiment, the obtaining, by a terminal device, a first control channel includes: obtaining, by the terminal device, the first control channel from the network device based on first basic information of the first uplink channel, where the first basic information includes at least one of the time-domain position occupied by the first uplink channel, the frequency-domain position occupied by the first uplink channel, and the reference signal used when the terminal device performs the uplink communication on the first uplink channel.

In one embodiment, identifier information of the first control channel is determined by the terminal device based on the first basic information of the first uplink channel, and the first control channel corresponds to the identifier information of the first control channel.

In one embodiment, a position of the first control information in the control information group corresponds to second basic information of the first uplink channel, and the second basic information includes at least one of the time-domain position occupied by the first uplink channel, the frequency-domain position occupied by the first uplink channel, and the reference signal used when the terminal device performs the uplink communication on the first uplink channel.

In one embodiment, the first control information includes at least one of hybrid automatic repeat request HARQ response information, transmit power adjustment value information, and beam configuration information.

Herein, the beam configuration information includes at least one of a quasi co-location (QCL) indicator, transmit beam information, information about a pair of transmit and receive beams, and the like. Alternatively, the beam configuration information includes a reference signal index and at least one of the following information corresponding to the reference signal index: reference signal received power (RSRP), reference signal received quality (RSRQ), a rank indication (RI), and a channel quality indicator (CQI).

In one embodiment, the HARQ response information includes at least one of HARQ discontinuous transmission state information, HARQ acknowledgement state information, and HARQ negative acknowledgement state information.

In one embodiment, the first uplink channel carries first uplink data, and the performing, by the terminal device, uplink communication with a network device based on the first control information includes: when the terminal device determines that the first control information is the HARQ acknowledgement state information, stopping, by the terminal device, sending, to the network device, a transport block corresponding to the first uplink data.

In one embodiment, the first uplink channel carries first uplink data, and the performing, by the terminal device, uplink communication with a network device based on the first control information includes: when the terminal device determines that the first control information is the HARQ negative acknowledgement state information, performing, by the terminal device, at least one of the following operations: re-sending, by the terminal device to the network device, a transport block corresponding to the first uplink data; reducing, by the terminal device, a count value of repeated transmissions of the transport block corresponding to the first uplink data by 1; and sending, by the terminal device, the first uplink data to the network device by using second transmit power, where the second transmit power is determined according to a first preset rule based on first transmit power, and the first transmit power is transmit power used when the terminal device sends the first uplink channel.

In one embodiment, the first uplink channel carries first uplink data, and the performing, by the terminal device, uplink communication with a network device based on the first control information includes: when the terminal device determines that the first control information is the HARQ discontinuous transmission state information, performing, by the terminal device, at least one of the following operations: sending, by the terminal device to the network device, a transport block corresponding to the first uplink data; keeping, by the terminal device, a count value of repeated transmissions of the transport block corresponding to the first uplink data unchanged; and sending, by the terminal device to the network device by using third transmit power, the transport block corresponding to the first uplink data, where the third transmit power is determined according to a second preset rule based on first transmit power, and the first transmit power is transmit power used when the terminal device sends the first uplink channel.

In one embodiment, the performing, by the terminal device, uplink communication with a network device based on the first control information includes: when the terminal device determines that the first control information is the transmit power adjustment value TPC information, performing, by the terminal device, at least one of the following operations: re-sending, by the terminal device to the network device, a transport block corresponding to first uplink data; reducing, by the terminal device, a count value of repeated transmissions of the transport block corresponding to the first uplink data by 1; and sending, by the terminal device to the network device by using fourth transmit power, the transport block corresponding to the first uplink data, where the fourth transmit power is determined based on the transmit power adjustment value information.

In one embodiment, the performing, by the terminal device, uplink communication with a network device based on the first control information includes: when the terminal device determines that the first control information is power adjustment value information, sending, by the terminal device, the first uplink channel to the network device by using fifth transmit power, where the fifth transmit power is determined by the terminal device according to a third preset rule based on the transmit power adjustment value information.

According to a second aspect, an embodiment of the present disclosure provides an uplink communication method. The method includes: determining, by a network device, a control information group, where the control information group includes a plurality of pieces of control information, the plurality of pieces of control information correspond to a plurality of uplink channels, the plurality of pieces of control information include first control information, and the first control information is control information corresponding to a first uplink channel in the plurality of uplink channels; and sending, by the network device, a first control channel, where the first control channel carries the control information group.

In one embodiment, before the sending, by the network device, a first control channel, the method further includes: receiving, by the network device, a signal that is sent by a terminal device by using the first uplink channel.

In one embodiment, the method further includes: performing, by the network device, joint coding on the plurality of pieces of control information; and
the first control channel carries information obtained after the joint coding is performed on the plurality of pieces of control information.

In one embodiment, the first uplink channel is an uplink channel configured by the network device for the terminal device.

In one embodiment, the method further includes: sending, by the network device, configuration information to the terminal device, where the configuration information is used to indicate at least one of a time-domain position occupied by the first uplink channel, a frequency-domain position occupied by the first uplink channel, and a reference signal used when the terminal device performs uplink communication on the first uplink channel; or the configuration information is used to indicate a sequence number of the first uplink channel in the plurality of uplink channels or an index of the first uplink channel; or the configuration information includes group identifier information of the terminal device, and the group identifier information corresponds to the first uplink channel.

In one embodiment, the control information group includes a plurality of bits, the plurality of bits are grouped into a plurality of bit sets, each bit set includes at least one bit, and each bit set is used to indicate one of the plurality of pieces of control information; or the control information group includes a plurality of bits, the plurality of bits include M valid values, and each valid value corresponds to a combination of the plurality of pieces of control information.

In one embodiment, positions of the plurality of bit sets in the control information group correspond to the plurality of uplink channels.

In one embodiment, the first control channel carries identifier information of the first control channel.

In one embodiment, the identifier information of the first control channel corresponds to first basic information of any one of the plurality of uplink channels, and the first basic information includes at least one of a time-domain position occupied by the uplink channel, a frequency-domain position occupied by the uplink channel, and a reference signal used when the terminal device performs uplink communication on the uplink channel.

In one embodiment, a position of the first control information in the control information group corresponds to second basic information of the first uplink channel, and the second basic information includes at least one of the time-domain position occupied by the first uplink channel, the frequency-domain position occupied by the first uplink channel, and the reference signal used by the terminal device on the first uplink channel.

In one embodiment, the first control information includes at least one of hybrid automatic repeat request HARQ response information, transmit power adjustment value information, and beam configuration information.

In one embodiment, the HARQ response information includes at least one of HARQ discontinuous transmission state information, HARQ acknowledgement state information, and HARQ negative acknowledgement state information.

In one embodiment, the first uplink channel carries first uplink data, and the method further includes: determining, by the network device, that the first uplink data is correctly obtained; the first control information is specifically the HARQ acknowledgement state information; and after the sending, by the network device, a first control channel, the method further includes: receiving, by the network device, second uplink data sent by the terminal device, where the second uplink data and the first uplink data correspond to different transport blocks.

In one embodiment, the first uplink channel carries first uplink data, and the method further includes: determining, by the network device, that the first uplink channel is received but the first uplink data is not correctly received; the first control information is specifically the HARQ negative acknowledgement state information; and after the sending, by the network device, a first control channel, the method further includes: receiving, by the network device, second uplink data that is sent by the terminal device by using second transmit power, where the second transmit power is determined according to a first preset rule based on first transmit power, the first transmit power is transmit power used when the terminal device sends the first uplink channel, and the second uplink data and the first uplink data correspond to a same transport block.

In one embodiment, the first uplink channel carries first uplink data, and the method further includes: determining, by the network device, that the first uplink channel is not received; the first control information is specifically the HARQ discontinuous transmission state information; and after the sending, by the network device, a first control channel, the method further includes: receiving, by the network device, a transport block that corresponds to the first uplink data and that is sent by the terminal device by using third transmit power, where the third transmit power is determined according to a second preset rule based on first transmit power, and the first transmit power is transmit power used when the terminal device sends the first uplink channel.

In one embodiment, the first control information is specifically the transmit power adjustment value information, and after the sending, by the network device, a first control channel, the method further includes: receiving, by the network device, a transport block that corresponds to first uplink data and that is re-sent by the terminal device; or receiving, by the network device, a transport block that corresponds to first uplink data and that is sent by the terminal device by using fourth transmit power, where the fourth transmit power is determined based on the transmit power adjustment value information.

In one embodiment, the first control information is specifically the transmit power adjustment value information, and after the sending, by the network device, a first control channel, the method further includes: receiving, by the network device, the first uplink channel that is sent by the terminal device by using fifth transmit power, where the fifth transmit power is determined according to a third preset rule based on the transmit power adjustment value information.

According to a third aspect, an embodiment of the present disclosure provides a communications apparatus, configured to perform the method according to the first aspect or any possible implementation of the first aspect. Specifically, the communications apparatus includes units for performing the method according to the first aspect or any possible implementation of the first aspect.

According to a fourth aspect, an embodiment of the present disclosure provides a communications apparatus, configured to perform the method according to the second aspect or any possible implementation of the second aspect. Specifically, the communications apparatus includes units for performing the method according to the second aspect or any possible implementation of the second aspect.

According to a fifth aspect, an embodiment of the present disclosure provides a terminal device. The terminal device includes one or more processors, one or more memories, and one or more transceivers (each transceiver includes a transmitter and a receiver). The transmitter or the receiver is connected to one or more antennas, and sends or receives a signal through the antenna. The memory is configured to store a computer program instruction (or code). The processor is configured to execute the instruction stored in the memory, and when the instruction is executed, the processor performs the method according to the first aspect or any possible implementation of the first aspect.

According to a sixth aspect, an embodiment of the present disclosure provides a network device. The network device includes one or more processors, one or more memories, and one or more transceivers (each transceiver includes a transmitter and a receiver). The transmitter or the receiver is connected to one or more antennas, and sends or receives a signal through the antenna. The memory is configured to store a computer program instruction (or code). The processor is configured to execute the instruction stored in the memory, and when the instruction is executed, the processor performs the method according to the second aspect or any possible implementation of the second aspect.

According to a seventh aspect, an embodiment of the present disclosure provides a computer readable storage medium. The computer readable storage medium stores an instruction, and when the instruction runs on a computer, the computer is enabled to perform the method according to the first aspect or any possible implementation of the first aspect.

According to an eighth aspect, an embodiment of the present disclosure provides a computer readable storage medium. The computer readable storage medium stores an instruction, and when the instruction runs on a computer, the computer is enabled to perform the method according to the second aspect or any possible implementation of the second aspect.

According to a ninth aspect, an embodiment of the present disclosure provides a computer program product. The computer program product includes computer program code, and when the computer program code runs on a computer, the computer is enabled to perform the method according to the first aspect and any possible implementation of the first aspect.

According to a tenth aspect, an embodiment of the present disclosure provides a computer program product. The computer program product includes computer program code, and when the computer program code runs on a computer, the computer is enabled to perform the method according to the second aspect and any possible implementation of the second aspect.

According to an eleventh aspect, an embodiment of the present disclosure provides a chip system. The chip system includes a processor, configured to implement a function of the terminal device according to the foregoing aspects, for example, receiving or processing data and/or information in the foregoing methods. In one embodiment, the chip system further includes a memory, and the memory is configured to store a program instruction and data for the terminal device. The chip system may include a chip, or may include a chip and another discrete component.

According to a twelfth aspect, an embodiment of the present disclosure provides a chip system. The chip system includes a processor, configured to implement a function of the network device according to the foregoing aspects, for example, receiving or processing data and/or information in the foregoing methods. In one embodiment, the chip system further includes a memory, and the memory is configured to store a program instruction and data for the terminal device. The chip system may include a chip, or may include a chip and another discrete component.

DESCRIPTION OF EMBODIMENTS

Figure 1:
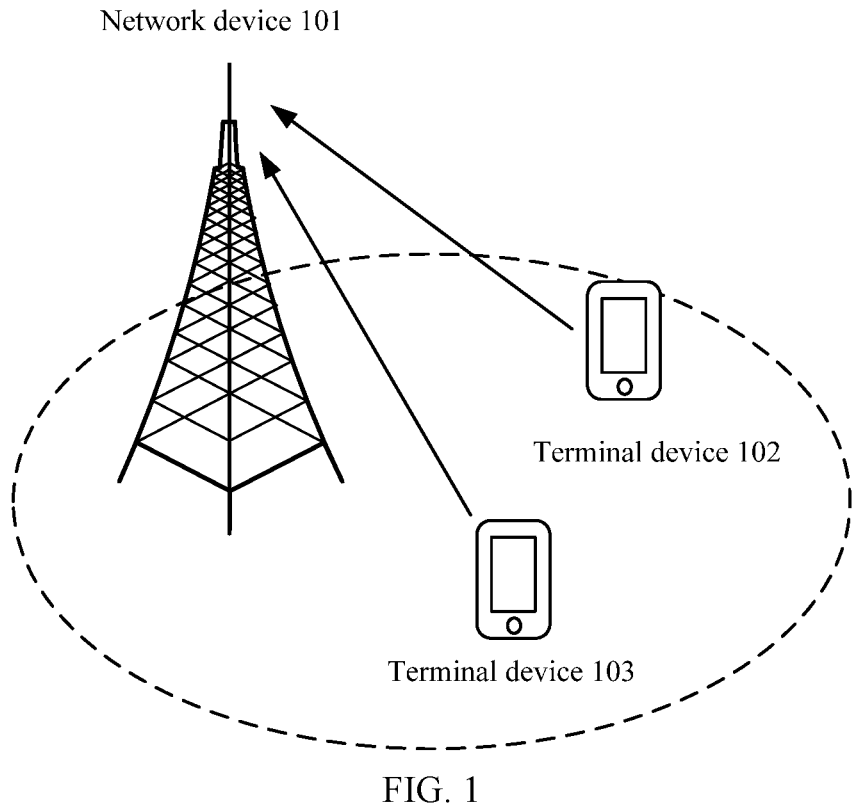
FIG. 1 is a diagram of an application scenario according to an embodiment of the present disclosure.

The following describes the technical solutions in the present disclosure with reference to the accompanying drawings.

Related technologies in embodiments of the present disclosure are briefly described first.

In a conventional long term evolution (LTE) system, there are mainly two manners for the foregoing data transmission. In a first manner, before performing uplink data transmission, a terminal device needs to first send an uplink transmission scheduling request to a network device. After receiving the uplink transmission scheduling request from the terminal device, the network device allocates an uplink transmission resource (such as a time-frequency resource) to the terminal device, and sends an uplink grant (UL grant) to the terminal device, so that the terminal device can send uplink data on the uplink transmission resource. Therefore, for conventional uplink data sending in LTE, from a time at which the terminal device needs to send uplink data to a time at which the network device receives the uplink data sent by the terminal device, particular time overheads are generated. In the other manner, in LTE, semi-persistent scheduling (SPS) uplink data transmission is further supported. In SPS, resource allocation features "one allocation and multiple use". For example, within a transmission time interval (TTI), the network device specifies, by using a PDCCH scrambled by using an SPS C-RNTI, a radio resource (referred to as an SPS resource herein for ease of description) used by specific UE to transmit uplink data. If the specific UE needs to send uplink data, within each period, the specific UE transmits the uplink data by using the SPS resource, without requesting the network device to allocate an uplink transmission resource to the specific UE each time. Similarly, the network device does not need to deliver, to the UE each time, a PDCCH carrying downlink control information (DCI), thereby reducing PDCCH overheads.

It is well known that, uplink power control in a wireless communications system is very important. Through the uplink power control, quality of uplink data sent by the terminal device can be ensured, interference to another terminal in the system can be reduced as much as possible, power of the UE can be saved, and a battery life is prolonged. In addition, through the uplink power control, the network device can enable uplink transmission to adapt to different wireless transmission environments, for example, a path loss, a shadow, fast fading, and mutual interference between intra-cell UEs and mutual interference between inter-cell UEs.

In the prior art, uplink power control is performed in two manners. In one manner, the network device instructs, by using uplink data scheduling information, the UE to send uplink data. The network device sends, to the UE in the uplink data scheduling information, a power adjustment value used for the uplink data. The UE adjusts transmit power of an uplink channel based on the power adjustment value in the uplink data scheduling information. In the other manner, the network device performs, in a unit of a "UE group" by using a plurality of pieces of control information in one control channel, power control on a plurality of UEs that transmit uplink data within a time period. Specifically, the network device indicates an uplink transmit power adjustment value to the UE in control signaling for a specific UE group. The control signaling includes a power adjustment value for each UE in the UE group.

With continuous development of communications technologies, uplink data transmission using an ultra-reliable and low latency communications (URLLC) technology and uplink grant free (UL Grant free) technology in a 5th generation (5G) mobile communications technology becomes one of future data transmission trends. In the URLLC technology, a higher requirement is proposed for a data transmission latency, while in the UL Grant free technology, the terminal device sends uplink data without depending on scheduling by the network device, but the network device preconfigures, for the terminal device, a resource used to send the uplink data. The network device may preconfigure, for a plurality of terminal devices, same time and frequency resources, and these terminal devices each occupy a configured resource through contention. In a grant free spectrum, in addition to contending for a preconfigured resource with another terminal device for which a same uplink resource is configured, the terminal device further needs to contend with another device sharing the grant free spectrum, to access the grant free spectrum. In these cases, the network device has no expectation on a time at which the terminal device sends uplink data.

When the network device has no expectation on the time at which the terminal device sends uplink data, in a manner in the prior art, a method for grouping a plurality of terminal devices into a terminal device group in advance, and sending respective control information of these UEs in the terminal device group on a downlink control channel cannot meet a requirement of the network device on efficiency of sending the control information to the terminal devices and a requirement of ensuring uplink data transmission performance. How to meet a requirement of a future new generation communications technology on data transmission becomes a problem urgently needing to be resolved, for example, how a network device performs power control on sending of uplink data by a terminal device, how to reduce a transmission latency, how to ensure uplink data transmission reliability, and how to improve transmission efficiency while implementing power control and ensuring reliability.

Therefore, an embodiment of the present disclosure provides an uplink communication method, so that a network device can control an uplink data transmission latency, reliability, and uplink transmit power in a UL grant free communication scenario.

The numbers "first", "second", and the like appearing in the embodiments of the present disclosure are merely used to distinguish between different objects, for example, to distinguish between different information, different transmit power, and the like, and should not constitute any limitation on the technical solutions in the embodiments of the present disclosure.

In the embodiments of the present disclosure, the network device is an apparatus deployed in a radio access network and configured to provide a wireless communication function for a terminal device. The network device may include various forms of base stations, macro base stations, micro base stations (also referred to as small cells), relay nodes, access points, or the like. In systems using different radio access technologies, a device having a function of a base station may be named differently. For example, the network device may be an access point (AP) in a WLAN, a base transceiver station (BTS) in GSM or CDMA, or an evolved NodeB (eNB or eNodeB) in an LTE system. Alternatively, the network device may be a NodeB in a 3rd generation (3G) system. Alternatively, the network device may be a base station in a future new generation (for example, 5G) wireless communications system or the like.

The terminal device in the embodiments of the present disclosure may also be referred to as user equipment (UE), an access terminal, a subscriber unit, a subscriber station, a mobile console, a mobile station (MS), a remote station, a remote terminal, a mobile terminal, a user terminal, a terminal, a wireless communications device, a user agent, or a user apparatus. By way of example, and not limitation, the terminal device in the embodiments of the present disclosure may include various handheld devices having a wireless communication function, an in-vehicle device, a wearable device, a computing device, or another processing device connected to a wireless modem. The terminal device may further include a subscriber unit, a cellular phone, a smartphone, a wireless data card, a personal digital assistant (PDA) computer, a tablet computer, a wireless modem, a handheld device (handset), a laptop computer, a machine type communication (MTC) terminal, or a station (ST) in a wireless local area network (WLAN). The terminal device may be a cellular phone, a cordless telephone, a session initiation protocol (SIP) telephone, a wireless local loop (WLL) station, a terminal device in a next generation communications system such as a 5th generation (5G) communications network, a terminal device in a future evolved public land mobile network (PLMN) network, or the like.

FIG. 1 is a diagram of an application scenario according to an embodiment of the present disclosure. Referring to FIG. 1, the application scenario includes a network device 101, a terminal device 102, and a terminal device 103. The terminal device 102 and the terminal device 103 are terminal devices within a coverage area of the network device 101. The terminal device 102 and the terminal device 103 transmit uplink data to the network device 101.

Uplink data transmission between the terminal device and the network device may be grant free data transmission. To be specific, the network device preconfigures at least one uplink data transmission channel for a terminal device in a serving cell by using configuration information. Configuration information of each uplink data transmission channel includes at least one of a time-domain position occupied by the transmission channel, a frequency-domain position occupied by the transmission channel, and a reference signal used when the terminal device performs uplink communication on the transmission channel. When needing to transmit uplink data, the terminal device selects a transmission channel from the at least one transmission channel allocated by the network device, and sends the uplink data by using the selected transmission channel. The network device detects, on the at least one transmission channel preconfigured for the terminal device, the uplink data sent by the terminal device.

It should be understood that, in FIG. 1, only two terminal devices within the coverage area of the network device 101 are used as an example. Apparently, there may alternatively be more terminal devices within the coverage area of the network device 101.

In the following embodiments, a network device corresponds to the network device 101 in FIG. 1, and a terminal device may correspond to the terminal device 102 or the terminal device 103 in FIG. 1.

Figure 2:
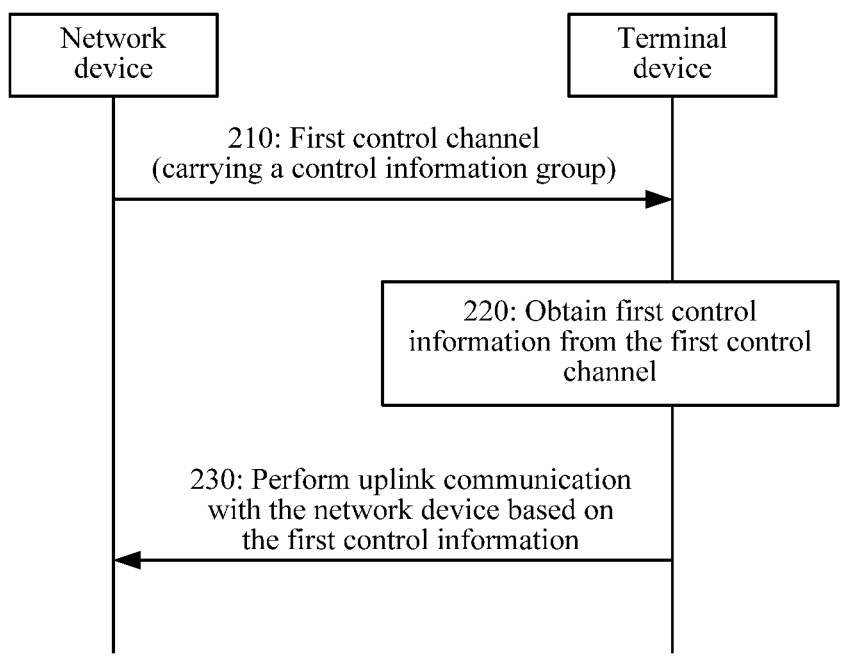
FIG. 2 is a schematic interaction diagram of an uplink communication method 200 according to the present disclosure.

FIG. 2 is a schematic interaction diagram of an uplink communication method 200 according to the present disclosure. Referring to FIG. 2, the method 200 mainly includes operation 210 to operation 230.

Operation 210: A network device sends a first control channel, and a terminal device obtains the first control channel.

The first control channel carries a control information group, the control information group includes a plurality of pieces of control information, and the plurality of pieces of control information correspond to a plurality of uplink channels.

In this embodiment of the present disclosure, a correspondence between control information and an uplink channel may be a one-to-one correspondence, or may be a one-to-many correspondence. For example, the network device may configure one piece of control information for two adjacent uplink channels. In the following embodiments, only an example in which control information is in a one-to-one correspondence with an uplink channel is used.

It should be understood that, before the network device sends the first control channel, the method further includes: determining, by the network device, the control information group.

For ease of description, control of the network device on uplink power, uplink data reliability, uplink data transmission efficiency, and the like below are collectively referred to as control of the network device on uplink communication of the terminal device. Control of the network device on the uplink communication below includes control on at least one of the foregoing factors (namely, uplink transmit power, a latency, reliability, and efficiency).

In this embodiment of the present disclosure, the first control channel carries one control information group. The control information group includes a plurality of pieces of control information, and each piece of control information corresponds to one uplink channel.

It should be understood that, the first control channel herein is used as an example of a control channel sent by the network device. Each piece of control information corresponds to one uplink channel. The uplink channel herein is an uplink channel configured by the network device for the terminal device and used to send uplink data. The network device may preconfigure one or more uplink data transmission channels for a terminal device in a serving cell by using configuration information. Herein, the plurality of uplink channels in a one-to-one correspondence with the plurality of pieces of control information included in the control information group may be one or more uplink data transmission channels configured by the network device for a same terminal device. In addition, the plurality of pieces of control information included in the control information group may alternatively be uplink data transmission channels respectively configured by the network device for a plurality of terminal devices, and the plurality of terminal devices each may include one or more uplink data transmission channels.

In one embodiment, in an embodiment, the control information group includes a plurality of bits, the plurality of bits are grouped into a plurality of bit sets, each bit set includes at least one bit, and each bit set is used to indicate one of the plurality of pieces of control information; or the control information group includes a plurality of bits, the plurality of bits include M valid values, and each valid value corresponds to a combination of the plurality of pieces of control information.

Figure 3:
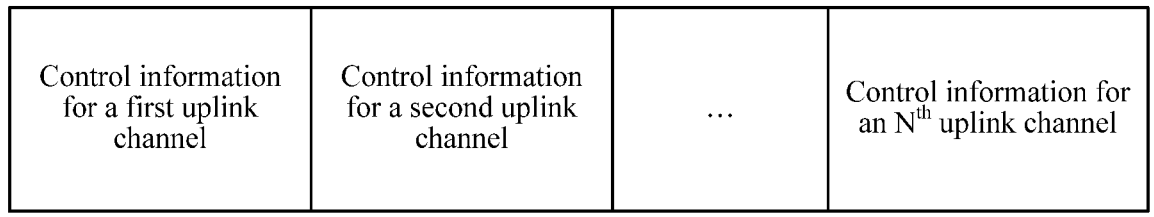
FIG. 3 shows a possible composition manner of a control information group according to the present disclosure.

FIG. 3 shows a possible composition manner of a control information group according to the present disclosure. Referring to FIG. 3, an example in which the control information group includes four pieces of control information is used. For example, the control information group includes 8 bits. The 8 bits are grouped into four bit sets, each bit set includes 2 bits, and the 2 bits in each bit set are used to indicate one piece of control information.

Table 1 shows another possible composition manner of a control information group provided in an embodiment of the present disclosure. Referring to Table 1, an example in which the control information group includes four pieces of control information is still used. For ease of description, the four pieces of control information are respectively denoted as control information #1, control information #2, control information #3, and control information #4. If the control information group includes 3 bits, the 3 bits may represent eight values, but only six of the eight values may be used, in other words, there are six valid values that are respectively 000, 001, 010, 011, 100, and 101. Each valid value corresponds to a different state of combination of control information in the control information group.

TABLE 1

| Valid values of N bits (N = 3) | Corresponding control information group | | | |
| --- | --- | --- | --- | --- |
| | Control information #1 | Control information #2 | Control information #3 | Control information #4 |
| 000 | 00 | 00 | 00 | 00 |
| 001 | 00 | 01 | 10 | 01 |
| 010 | 10 | 10 | 01 | 00 |
| 011 | 11 | 01 | 10 | 01 |
| 100 | 10 | 01 | 01 | 10 |
| 101 | 01 | 11 | 11 | 01 |

As shown in Table 1, in this manner, each valid value of the N bits in the control information group corresponds to a combination of control information. The network device and the terminal device may pre-agree on a combination, of control information, corresponding to each valid value. After obtaining the control information group, the terminal device can learn, based on a current valid value of the N bits in the control information group, of a state of each piece of control information in the control information group, and can also obtain control information for the terminal device. During specific implementation, the network device and the terminal device may each prestore a mapping table similar to Table 1. How the terminal device obtains the control information for the terminal device from the control information group is described in detail below. It should be noted that, Table 1 is merely an example of a correspondence between a valid value of the N bits and a control channel in the control information group, and a specific correspondence is not limited thereto.

In this embodiment of the present disclosure, a control channel sent by the network device carries a control information group, and the control information group corresponds to an uplink channel group. Uplink channels included in the uplink channel group may be channels having same time and frequency resources but different code division resources. Alternatively, uplink channels included in the uplink channel group may be channels having same time and frequency resources but corresponding to different reference signals.

Figure 5:
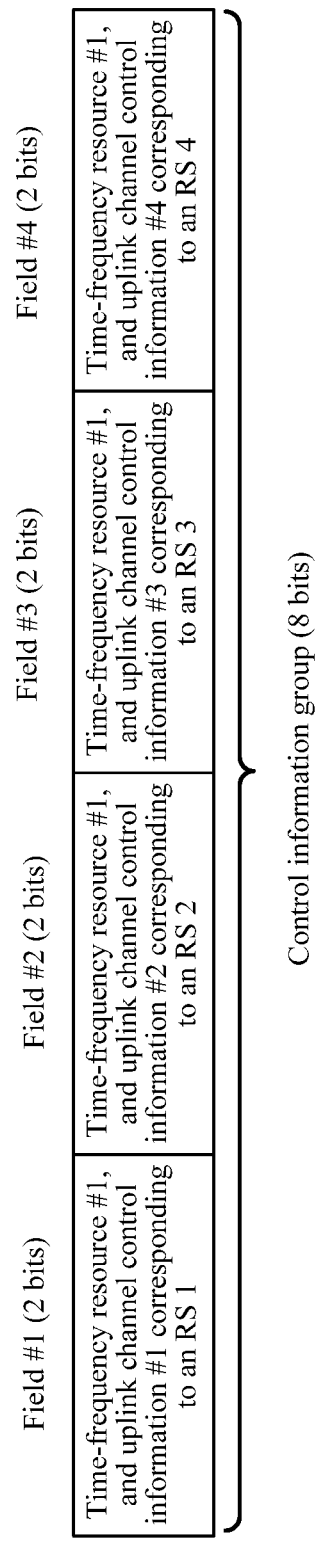
FIG. 5 shows an example of a control information group according to the present disclosure.

In the technical solutions in this embodiment of the present disclosure, if the network device sends control information for each uplink channel through one control channel, control channel overheads are very large. In addition, the terminal device needs to detect, in control channels having various lengths and sent by the network device, a control channel conforming to a length of a bit quantity of corresponding control information, leading to relatively high complexity of blind detection by the terminal device. However, the foregoing control information occupies only a relatively small quantity of bits. Therefore, if a distribution format shown in FIG. 5 is used, that is, if control information corresponding to a plurality of uplink channels is sent on one control channel, transmission efficiency of the network device is improved, and complexity of blindly detecting a control channel by the terminal device is reduced.

Certainly, in this embodiment of the present disclosure, the network device sends the first control channel, and the terminal device obtains the first control channel. The first control channel carries the control information group, the control information group includes the plurality of pieces of control information, and the plurality of pieces of control information are in a one-to-one correspondence with the plurality of uplink channels. Alternatively, the network device sends the first control channel, and the terminal device obtains the first control channel. The first control channel carries first control information, and the first control information corresponds to a first uplink channel. To be specific, the first control channel has only one piece of control information corresponding to one uplink channel.

It may be understood that, in this embodiment of the present disclosure, preferably, the uplink channel is used to transmit UL grant free uplink data. Therefore, the uplink channel is a resource configured by the network device and used to transmit the UL grant free uplink data.

When configuring, for the terminal device, the resource used to transmit the UL grant free uplink data, the network device usually considers the following factors: a time-domain resource, a frequency-domain resource, a modulation and coding scheme (MCS), a reference signal, a quantity K of repetitions, and the like.

The first uplink channel corresponding to the first control information in the control information group is used as an example. The first uplink channel is an uplink channel configured by the network device for the terminal device based on configuration information. The configuration information includes at least one of a time-domain position occupied by the first uplink channel, a frequency-domain position occupied by the first uplink channel, and a reference signal used when the terminal device performs uplink communication on the first uplink channel.

In consideration of arrival uncertainty of a URLLC service, resource utilization is low if different UL grant free resources are reserved for terminal devices. Therefore, in this embodiment of the present disclosure, the network device may configure a same UL grant free uplink data transmission resource for different terminal devices.

However, considering that terminal devices for which same time-domain and frequency-domain resources are configured may simultaneously send UL grant free uplink data, to enable the network device to distinguish a terminal device from which UL grant free uplink data is received, different reference signals may be configured for UEs for which same time-domain and frequency-domain resources are configured. In addition, these different reference signals need to be orthogonal to each other. Alternatively, different code resources may be configured for terminal devices for which same time-domain and frequency-domain resources are configured. When the terminal device sends a signal on a preconfigured resource, in a code division manner, a network can distinguish a terminal device sending uplink data. For example, uplink channels configured for a terminal device #1 and a terminal device #2 occupy a same time-domain position and a same frequency-domain position, but reference signals respectively used when the terminal device #1 and the terminal device #2 send uplink data on resources having the same time-domain position and the same frequency-domain position are different, so that the network device receives the reference signal to identify the terminal device sending the uplink data.

In addition, the network device may alternatively configure, for different terminal devices, different time domain resources and frequency domain resources used to transmit UL grant free uplink data. For example, uplink channels having adjacent time-frequency resources are configured for the different terminal devices.

Examples of two manners (denoted as a manner 1 and a manner 2 below) in this embodiment of the present disclosure in which the plurality of pieces of control information in the control information group correspond to the plurality of uplink channels are provided below.

Manner #1

The plurality of uplink channels occupy a same time-domain resource and a same frequency-domain resource, but reference signals used when the terminal device occupies uplink channels to send uplink data are different.

That is, the plurality of uplink channels are channels having a same time and a same frequency in resources preconfigured by the network device and used to transmit UL grant free uplink data.

Figure 4:
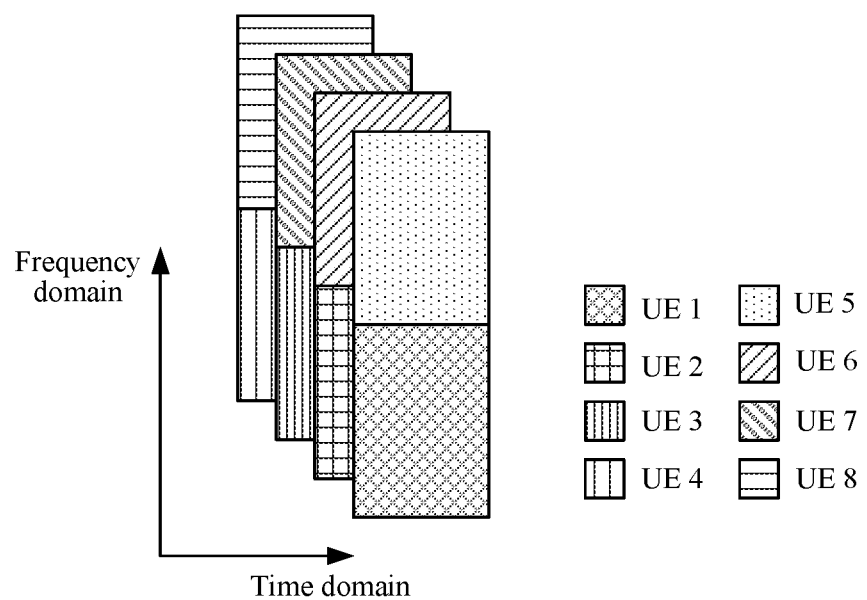
FIG. 4 shows a manner in which a plurality of uplink channels occupy a time-frequency resource according to the present disclosure.

FIG. 4 shows a form of occupying a time-frequency resource by a plurality of uplink channels according to the present disclosure. As shown in FIG. 4, for example, channels configured by the network device for UE 1 to UE 4 and used to transmit UL grant free uplink data form an uplink channel group (denoted as an uplink channel group #A), and channels configured for UE 5 to UE 8 and used to transmit UL grant free uplink data form another uplink channel group (denoted as an uplink channel group #B). The uplink channel group #A and the uplink channel group #B each include four uplink channels. The four uplink channels in the uplink channel group #A occupy a same time period and occupy a same frequency band. The four uplink channels in the uplink channel group #B occupy a same time period and occupy a same frequency band. The uplink channels respectively included in the uplink channel group #A and the uplink channel group #B occupy different frequency-domain resources.

As described above, in this manner, for UEs belonging to one uplink channel group, reference signals used on a same uplink channel that are configured by the network device for the UEs are orthogonal to each other. For example, the network device respectively configures different reference signals, namely, an RS 1, an RS 2, an RS 3, and an RS 4 for the UE 1 to the UE 4. The network device respectively configures different reference signals, namely, an RS 1, an RS 2, an RS 3, and an RS 4 for the UE 5 to the UE 8. In addition, the RS 1, the RS 2, the RS 3, and the RS 4 are orthogonal to each other.

The network device detects reference signals on resources (uplink channels) configured for the UE 1 to the UE 4, and the network device can distinguish, by using the different reference signals, UE that is in the UE 1 to the UE 4 and from which the received uplink data is sent.

Manner #2

The plurality of uplink channels respectively occupy adjacent time-domain resources or adjacent frequency-domain resources, and for a same time resource and frequency-domain resource, reference signals used when the terminal device occupies uplink channels to send uplink data are different.

To be specific, the plurality of uplink channels are channels in resources that have a same time or frequency or have adjacent times or frequencies and that are preconfigured by the network device and used to transmit UL grant free uplink data, and on resources having a same time and frequency, corresponding reference signals are different and orthogonal.

Still refer to FIG. 4. As shown in FIG. 4, the four uplink channels in the uplink channel group #A and the four uplink channels in the uplink channel group #B (eight uplink channels in total) may form a plurality of channels corresponding to the plurality of control channels included in the foregoing control channel group.

In this embodiment of the present disclosure, a correspondence between control information included in the control information group and an uplink channel corresponding to the control information may be preset by the network device and the terminal device. In other words, a quantity of control information used by the network device as control information included in the control information group carried in the first control channel may be preset. The network device forms, based on the preset quantity of control information included in the control information group carried in the first control channel, a control information group having N bits for n-bit control information of each uplink channel, and sends the control information group to the terminal device, where N=n×k, and k is the quantity of control information.

In addition, uplink channels whose corresponding control information forms the control information group may alternatively be preset by the network device and the terminal device, and the terminal device may determine, according to a specified rule, a control information group to which control information corresponding to an uplink channel configured by the network device for the terminal device and used to transmit uplink data belongs, and a control channel corresponding to the control information group.

It should be noted that, the network device determines the control information group, the control information group includes the plurality of pieces of control information, and the plurality of pieces of control information are in a one-to-one correspondence with the plurality of uplink channels. The network device may preconfigure the plurality of uplink channels for a same terminal device, or respectively preconfigure the plurality of uplink channels for different terminal devices. The terminal device does not necessarily send uplink data on the configured uplink channel. For such an uplink channel that is configured but is not used by the terminal device to send uplink data, the network device may have no control information to be sent for the uplink channel. However, because the first control channel includes indication fields of control information corresponding to these uplink channels, when sending the first control channel, the network device also needs to add particular control information to the indication fields of the control information corresponding to these uplink channels. In this case, the network device may add default control information to the indication fields of the control information corresponding to these uplink channels, or add control information in any state to the indication fields of the control information corresponding to these uplink channels. For example, as shown in FIG. 4, the control information group carried in the first control channel sent by the network device includes control information respectively corresponding to the uplink channels included in the uplink channel group #A. However, actually, only the UE 1 sends uplink data on an uplink channel resource that is in the uplink channel group #A and that is configured for the UE 1, and uses the reference signal RS 1. Therefore, in the control information group carried in the first control channel sent by the network device, for the uplink data received on the uplink channel resource that is in the uplink channel group #A and that is configured for the UE 1, control information corresponding to the uplink channel is generated. Control information corresponding to an uplink channel that is in the uplink channel group #A and that is configured for another UE carries control information in a default state, or carries control information in any state. In another case, even if the terminal device sends no uplink data on a configured uplink channel, the network device may also send control information for uplink data on control information that is in the control information group and that corresponds to the uplink channel to the terminal device, for example, control information of a transmit power control command.

In the example in FIG. 4, it is assumed that the first control channel sent by the network device includes a control information group including control information for four channels. The four channels are respectively: an uplink channel configured by the network device for the UE 1, where a configured reference signal is the RS 1; an uplink channel configured by the network device for the UE 2, where a configured reference signal is the RS 2; an uplink channel configured by the network device for the UE 3, where a configured reference signal is the RS 3; and an uplink channel configured by the network device for the UE 4, where a configured reference signal is the RS 4. The network device receives, only on the channel configured for the UE, uplink data sent by the UE 1, and the reference signal is the RS 1. However, the network device still sends the control information for the four channels on the first control channel. Control information of uplink resources configured for the UE 2, the UE 3, and the UE 4 have a default value or any value. For the UE 1, after the UE 1 receives the first control channel, the UE 1 may obtain, through detection and demodulation, the control information sent by the network device for the four channels. However, the UE 1 cares about only control information corresponding to the uplink channel for the UE 1.

After configuring the uplink channel for the terminal device, the network device needs to notify the terminal device of the uplink channel corresponding to the terminal device.

In one embodiment, in an embodiment, the method further includes:

receiving, by the terminal device, configuration information sent by the network device, where the configuration information is used to indicate at least one of a time-domain position occupied by the first uplink channel, a frequency-domain position occupied by the first uplink channel, and a reference signal used when the terminal device performs uplink communication on the first uplink channel; or the configuration information is used to indicate a sequence number of the first uplink channel in the plurality of uplink channels or an index of the first uplink channel; or the configuration information includes group identifier information of the terminal device, and the group identifier information corresponds to the first uplink channel.

In this embodiment of the present disclosure, the configuration information is signaling configured at a higher layer, and is used to indicate, to a terminal device, an uplink channel allocated by the network device to the terminal device.

Specifically, the configuration information indicates at least one of the time-domain position occupied by the first uplink channel, the frequency-domain position occupied by the first uplink channel, and the reference signal used when the terminal device performs the uplink communication on the first uplink channel; or the configuration information indicates the sequence number of the first uplink channel in the plurality of uplink channels or the index of the first uplink channel; or the configuration information may indicate the group identifier information of the terminal device. Correspondingly, the terminal device receives the configuration information sent by the network device, and can learn, based on specific content indicated by the configuration information, the uplink channel configured by the network device for the terminal device. Subsequently, the terminal device may send a signal (or data) to the network device by using the uplink channel.

The group identifier information of the terminal device corresponds to the uplink channel for the terminal device. In other words, the network device configures an uplink channel for each terminal device, and allocates one piece of group identifier information to the uplink channel. After receiving the group identifier information sent by the network device to the terminal device, the terminal device can identify, from the control information group in the obtained first control channel, the control information of the network device for the uplink channel for the terminal device.

In one embodiment, in an embodiment, the first control channel carries information obtained after joint coding is performed on the plurality of pieces of control information.

It may be understood that, an error may occur during signal transmission because of interference and signal attenuation during communication. Therefore, error correction and error detection (also referred to as an error correction and error detection coding technology) usually need to be performed on a transmission channel, to enhance a capability of a signal to resist various types of interference when the signal is transmitted on a channel, thereby improving system reliability. Without loss of generality, a transmit end may add redundant data to original data that needs to be sent, and the redundant data is related to data. A receive end performs detection and error correction on received data based on relevancy between the redundant data and the original data. For example, the terminal device may perform, by using a convolutional code (CC) or a polar code, channel coding on uplink data that needs to be sent.

As described above, the control information group carried in the first control channel includes the plurality of pieces of control information that respectively correspond to a first uplink channel, a second uplink channel, . . . , and an $N^{th}$ uplink channel. Before sending the first control channel, the network device needs to perform the joint coding on the plurality of pieces of control information.

In an implementation, the network device separately codes the plurality of pieces of control information. For example, repeated coding is performed on control information corresponding to each uplink channel.

In another implementation, the network device performs the joint coding on the plurality of pieces of control information. In addition, in consideration of channel coding efficiency and a channel coding performance advantage, the network device adds, to the first control channel, the information obtained after the joint coding is performed on the plurality of pieces of control information in the control information group. For example, the plurality of pieces of control information in the control information group include L bits, and the network device generates coded information based on the L bits.

Correspondingly, if the network device sends, on the first control channel, the information obtained after the joint coding is performed on the plurality of pieces of control information, the terminal device first obtains the information obtained after the joint coding from the first control channel. Then the terminal device decodes the information, to finally obtain the plurality of pieces of control information.

As described above, the plurality of pieces of control information in the control information group may be control information for uplink channels for a plurality of UEs. For a terminal device, even if the terminal device performs uplink communication with the network device based only on control information corresponding to an uplink channel configured for the terminal device, because the first control channel carries the information obtained after the joint coding is performed on the plurality of pieces of control information, the terminal device also needs to receive and decode the information to obtain each of the plurality of pieces of control information, and determine, in the plurality of pieces of control information, first control information corresponding to the uplink channel configured for the terminal device.

In this embodiment of the present disclosure, the terminal device obtains the first control channel in two cases.

Case #1

Before transmitting the uplink data, the terminal device receives the first control channel sent by the network device.

In this case, the network device sends the first control information to the terminal device based on some other information of the terminal device before the terminal device starts sending the uplink data by using the first uplink channel configured for the terminal device. After receiving the first control channel, and obtaining the first control information for the first uplink channel from the control information group carried in the first control channel, the terminal device may subsequently send the uplink data to the network device based on content of the first control information (for example, the first control information is a transmit power adjustment value for the first uplink channel). Based on this, the network device can control the uplink communication of the terminal device.

For example, the network device may determine, based on position information of the terminal device, that the terminal device is away from a center of a serving cell, and is gradually approaching an edge of the cell. In this case, the network device may send transmit power control (TPC) information to the terminal device. Although before starting transmitting the uplink data by using the configured first uplink channel, the terminal device can receive power adjustment information sent by the network device and used when the terminal device sends data on the configured first uplink channel, if the terminal device needs to send uplink data after receiving the first control channel, transmit power of the first uplink channel may be adjusted based on the power adjustment value information. It can be learned that, in this case, the network device can also control the uplink communication of the terminal device.

Case #2

After sending the first uplink channel carrying first uplink data, the terminal device receives the first control channel sent by the network device.

In one embodiment, in an embodiment, before the terminal device obtains the first control channel, the method further includes:

sending, by the terminal device, a signal to the network device by using the first uplink channel; and obtaining, by the terminal device, the first control channel based on the first uplink channel.

In the case 2, before the terminal device sends the uplink data (or an uplink signal) by using a UL grant free resource, the terminal device cannot obtain power adjustment control information. In view of this, when initially sending the uplink data, the terminal device first roughly determines transmit power (referred to as initial transmit power below) of the uplink data by using at least one of parameters such as target received power of the network device, a path loss (PL) measured by the terminal device, a modulation and coding scheme of UL grant free uplink data, and a quantity of resources occupied by the UL grant free uplink data.

$$P_{PUSCH}(i) = \min \begin{cases} P_{CMAX,C}(i), \\ 10\log_{10}(M_{PUSCH,C}(i)) + P_{O\_PUSCH}(j) + \alpha_C(j) \cdot PL_C + \Delta_{TF,C} \end{cases} \quad (1)$$

If the terminal device sends UL grant free uplink data in a subframe i in a cell C, and further sends a channel having a priority higher than that of the UL grant free uplink data, the initial transmit power $P_{PUSCH,\,C}(i)$ may be determined based on the following formula (2):

$$P_{PUSCH}(i) = \min \begin{cases} 10\log_{10}(\hat{P}_{CMAX,C}(i) - \hat{P}(i)), \\ 10\log_{10}(M_{PUSCH,C}(i)) + P_{O\_PUSCH}(j) + \alpha_C(j) \cdot PL_C + \Delta_{TF,C} \end{cases} \quad (2)$$

Physical meanings of the parameters in the formulas (1) and (2) are as follows:

$P_{CMAX,C}(i)$ is maximum transmit power that is for sending the uplink data in the subframe i in the cell C and that is determined by the UE.

$\hat{P}_{CMAX,\,C}(i)$ is a linear value of $P_{CMAX,C}(i)$.

$\hat{P}(i)$ is a linear value of transmit power of another channel sent by the UE in the subframe i in the cell C and having a priority higher than that of the UL grant free uplink data.

$M_{PUSCH,C}(i)$ is an amount related to a bandwidth of a resource occupied by the UL grant free uplink data.

$P_{O\_PUSCH,C}$ is a value configured by using higher layer signaling.

$\alpha_C(j)$ is a path loss compensation factor of the cell C.

$PL_C$ is a path loss of the cell C that is measured by the UE.

$\Delta_{TF,\,C}$ is an amount determined by the terminal device based on a parameter configured by using higher layer signaling, a quantity of transport blocks of the UL grant free uplink data, a quantity of resources used by the UL grant free uplink data, and the like.

It may be understood that, in the foregoing case 2, for the transmit power determined when the UL grant free uplink data is initially sent in the subframe i in the cell C, a transmit power adjustment value of the network device for the subframe i in the cell C is not considered. Therefore, based on the transmit power used when the UE initially sends the UL grant free uplink data in the subframe i in the cell C, quality of the uplink data may not be ensured, and interference to another terminal device in a system may not meet a requirement for a controllable level.

In one embodiment, after sending the first uplink channel to the network device, the terminal device obtains the first control channel based on the first uplink channel, and determines the first control information in the first control channel. The first control information may alternatively be other control information for the first uplink channel that is sent by the network device to the terminal device, for example, hybrid automatic repeat request (HARQ) response information, including at least one of an acknowledgement (ACK), a negative acknowledgement (NACK), and Discontinuous Transmission (DTX), where the ACK, the NACK, and the DTX are collectively referred to as HARQ-ACK information.

The network device provides a feedback to the terminal device based on a status of reception of the first uplink channel sent by the terminal device (for example, whether the first uplink channel is detected, or whether the uplink data carried in the first uplink channel is correctly obtained), to control sending of uplink data by the terminal device subsequently. How the terminal device obtains the first control channel from control channels sent by the network device is described below.

In this embodiment of the present disclosure, the network device and the terminal device may identify the control channel according to a preset rule. The network device adds identifier information of the network device to the control channel sent to the terminal device, so that the UE identifies a detected control channel, to obtain the control channel for the UE.

In one embodiment, in an embodiment, the obtaining, by the terminal device, the first control channel includes:

obtaining, by the terminal device, the first control channel from the network device based on first basic information of the first uplink channel, where the first basic information includes at least one of the time-domain position occupied by the first uplink channel, the frequency-domain position occupied by the first uplink channel, and the reference signal used when the terminal device performs the uplink communication on the first uplink channel.

Further, the first control channel corresponds to identifier information of the first control channel, and the identifier information of the first control channel is determined by the terminal device based on the first basic information of the first uplink channel.

To be specific, the obtaining, by the terminal device, the first control channel from the network device based on first basic information of the first uplink channel includes:

determining, by the terminal device, the identifier information of the first control channel based on the first basic information of the first uplink channel; and obtaining, by the terminal device, the first control channel from the network device based on the identifier information of the first control channel.

It should be noted that, herein, the reference signal used when the terminal device performs the uplink communication on the first uplink channel is information configured by the network device for the terminal device and used to transmit the uplink data. Even if the terminal device does not send uplink data by using a configured channel, the terminal device can also obtain the first control channel from the network device by using the reference information.

Each control channel sent by the network device carries a radio network temporary identifier (RNTI), used to determine a type of the control information by the terminal device and the network device, for example, determine that the control information on the control channel sent by the network device is a system message (corresponding to an SI-RNTI), a paging message (corresponding to a P-RNTI), or the like. The terminal device detects, in the control channel sent by the network device, a control channel carrying an RNTI related to the terminal device. The network device adds the identifier information of the network device to the first control channel, so that the terminal device identifies the first control channel.

For example, the identifier information of the first control channel is an X-RNTI, and the X-RNTI is determined based on first basic information of any one of the plurality of uplink channels corresponding to the plurality of pieces of control information in the control information group.

A process in which the network device sends the first control channel is as follows: The network device performs cyclic redundancy check (CRC) coding on the control information included in the control information group, determines CRC check information, and performs scrambling by using RNTI information corresponding to the control channel and the CRC check information. Then the network device performs joint coding on the control information included in the control information group, and information obtained after the scrambling by using the RNTI information corresponding to the control channel and the CRC check information, and then sends the control information and the information. On a terminal device side, the terminal device receives and decodes the control information to obtain the control information included in the control information group and the information obtained after the scrambling by using the RNTI information corresponding to the control channel and the CRC check information on a receive side. The terminal device descrambles, by using various types of RNTI information of the terminal device, "the information obtained after the scrambling by using the RNTI information corresponding to the control channel and the CRC check information", and the terminal device performs CRC check on information obtained after the descrambling by using the RNTI information. If the CRC check succeeds, it is considered that the control channel carries control information corresponding to a used RNTI for descrambling.

In this embodiment, the network device uses an X-RNTI when sending the first control channel, and the terminal device descrambles, by using the X-RNTI, "the information obtained after the scrambling by using the RNTI information corresponding to the control channel and the CRC check information" in the received information, and if the subsequent CRC check succeeds, may determine that the control channel is the first control channel.

For example, the first basic information includes the time-domain position occupied by the first uplink channel and the frequency-domain position occupied by the first uplink channel. It is assumed that the time-domain position occupied by the first uplink channel and the frequency-domain position occupied by the first uplink channel are respectively indicated by t_id and f_id. The terminal device may determine the X-RNTI by using a function X-RNTI=f(t_id,f_id). The first control channel carries the control information group, the control information group includes the plurality of pieces of control information, and the plurality of pieces of control information correspond to the plurality of uplink channels. The plurality of channels may be different channels configured for one terminal device, or may be uplink channels configured for different terminal devices. All these different terminal devices need to obtain the first control channel, and obtain, from the first control channel, control information for the uplink channels configured by the network device for the terminal devices. Therefore, identifier information that is of the first control channel and that is determined by the different terminal devices based on first basic information of the uplink channels configured for the terminal devices should be the same. For example, X-RNTIs determined by the different terminal devices are the same. To be specific, the function X-RNTI=f(t_id,f_id) needs to ensure that X-RNTIs determined by the different terminal devices based on the first basic information of the uplink channels configured for the terminal devices are the same. In addition, identifier information of control channels sent by the network device other than the first control channel may also be related to the first basic information of the first uplink channel. To distinguish between the first control channel and these control channels, the function X-RNTI=f(t_id,f_id) needs to ensure that X-RNTIs of the other control channels are distinguished.

The terminal device may calculate the X-RNTI by using a function X-RNTI=f(t_id,f_id) related to a time-domain position and a frequency-domain position, where the time-domain position and the frequency-domain position of the first uplink channel are respectively indicated by t_id and f_id. The terminal device may identify, based on the X-RNTI, the first control channel from the control channels sent by the network device.

For example, as shown in FIG. 4, the control information group carried in the first control channel sent by the network device includes control information respectively corresponding to the uplink channels in the uplink channel group #A. It is assumed that the first basic information is a time position and a frequency position that are occupied by the first uplink channel. Because time positions and frequency positions of the uplink channels configured by the network device for the UE 1, the UE 2, the UE 3, and the UE 4 and used to transmit UL grant free uplink data are the same, the UE 1, the UE 2, the UE 3, and the UE 4 all need to determine a same X-RNTI (namely, the identifier information of the first control channel) by using f(t_id,f_id), and determine the first control channel in the plurality of control channels sent by the network device.

For another example, as shown in FIG. 4, the control information group carried in the first control channel sent by the network device includes the control information respectively corresponding to the uplink channels in the uplink channel group #A and the uplink channel group #B. The uplink channels in the uplink channel group #A and the uplink channel group #B include channels configured by the network device for the UE 1, the UE 2, the UE 3, the UE 4, the UE 5, the UE 6, the UE 7, and the UE 8 and used to transmit UL grant free uplink data. It is assumed that the first basic information is a time position and a frequency position that are occupied by the first uplink channel. Similarly, it is assumed that time positions and frequency positions of channels configured by the network device for the UE 1, the UE 2, the UE 3, and the UE 4 and used to transmit UL grant free uplink data are the same, and are respectively t_id=A and f_id=B; and time positions and frequency positions of channels configured by the network device for the UE 5, the UE 6, the UE 7, and the UE 8 and used to transmit UL grant free uplink data are respectively the same, and are respectively t_id=C and f_id=D. For a time unit for sending uplink data, A=C, but B≠D. It is assumed that the first basic information is the time position and the frequency position that are occupied by the first uplink channel. The UE 1, the UE 2, the UE 3, and the UE 4 need to determine a same X-RNTI based on A, B, and f(t_id,f_id), and the UE 5, the UE 6, the UE 7, and the UE 8 need to determine a same X-RNTI based on C, D, and f(t_id,f_id), to identify the first control channel from the control channels sent by the network device.

In other words, for UEs configured to use the uplink channels corresponding to the plurality of pieces of control information in the control information group, even if respective first basic information of the first uplink channel of the UEs is not completely the same, identifier information of a same control channel needs to be determined based on the respective first basic information. To be specific, the identifier information of the first control channel corresponds to first basic information of any one of the plurality of uplink channels corresponding to the control information in the control information group. The first basic information includes at least one of a time-domain position occupied by the uplink channel, a frequency-domain position occupied by the uplink channel, and a reference signal used when the terminal device performs uplink communication on the uplink channel.

Operation 220: The terminal device obtains first control information from the first control channel.

The first control information is control information of the network device for the first uplink channel in the plurality of uplink channels.

In one embodiment, in an embodiment, a position of the first control information in the control information group corresponds to second basic information of the first uplink channel, and the second basic information includes at least one of the time-domain position occupied by the first uplink channel, the frequency-domain position occupied by the first uplink channel, and the reference signal used when the terminal device performs the uplink communication on the first uplink channel.

For example, the control information group is carried in a first field group of the first control channel, the terminal device obtains the first control information from a first field in the first field group, and a position of the first field in the first field group corresponds to the second basic information of the first uplink channel.

As described above, the terminal device obtains the first control channel from the control channels sent by the network device, and the first control channel carries the control information group. The terminal device needs to determine, in the control information group, the control information of the first uplink channel configured by the network device for the terminal device. The position of the first control information in the control information group corresponds to the second basic information of the first uplink channel. For example, the control information group is carried in the first field group of the first control channel, and the first field group includes a plurality of fields. After obtaining a same control channel, UEs for which a same uplink channel group is configured need to find, from the plurality of fields of the control channel, fields respectively belonging to the UEs.

FIG. 4 is still used as an example. It is assumed that the first control channel sent by the network device includes a control information group including control information for four channels. The four channels are respectively: an uplink channel configured by the network device for the UE 1, where a configured reference signal is the RS 1; an uplink channel configured by the network device for the UE 2, where a configured reference signal is the RS 2; an uplink channel configured by the network device for the UE 3, where a configured reference signal is the RS 3; and an uplink channel configured by the network device for the UE 4, where a configured reference signal is the RS 4. After obtaining the first control channel based on the identifier information (such as the X-RNTI) of the first control channel, the UE 1, the UE 2, the UE 3, and the UE 4 further need to respectively obtain, from the first control channel, that control information respectively sent by the network device to the UE 1, the UE 2, the UE 3, and the UE 4 is which information in the control information group. If the first control channel includes four fields of control information (namely, the first field group), the UE 1, the UE 2, the UE 3, and the UE 4 respectively determine, by using the reference signals respectively configured by the network device for the UE 1, the UE 2, the UE 3, and the UE 4, a field that is in the four fields and to which the control information respectively sent by the network device to the UE 1, the UE 2, the UE 3, and the UE 4 belongs.

It is assumed that, it is predefined that the RS 1 corresponds to the first field in the first field group, the RS 2 corresponds to a second field in the first field group, the RS 3 corresponds to a third field in the first field group, and the RS 4 corresponds to a fourth field in the first field group. In this way, the UE 1, the UE 2, the UE 3, and the UE 4 may respectively determine, by using the reference signals respectively configured by the network device for the UE 1, the UE 2, the UE 3, and the UE 4, fields in the first field group that respectively include control information for the UE 1, the UE 2, the UE 3, and the UE 4. It should be understood that, an example in which the second basic information is the reference signal is used herein. In one embodiment, the second basic information includes at least one of the time-domain position occupied by the first uplink channel, the frequency-domain position occupied by the first uplink channel, and the reference signal used when the terminal device performs the uplink communication on the first uplink channel.

For example, the second basic information includes the reference signal used when the terminal device performs the uplink communication on the first uplink channel. It is assumed that the reference signal used when the terminal device performs the uplink communication on the first uplink channel is indicated by s_id. The terminal device may determine the position of the first control information in the control information group by using a function L=f(s_id). The first control channel carries the control information group, the control information group includes the plurality of pieces of control information, and the plurality of pieces of control information correspond to the plurality of uplink channels. The plurality of channels may be different channels configured for one terminal device, or may be uplink channels configured for different terminal devices. All these different terminal devices need to obtain, from the first control channel, control information of the network device for the uplink channels respectively configured for the terminal devices. Therefore, positions determined by the different terminal devices based on second basic information of the uplink channels respectively configured for the terminal devices should be different. As shown in FIG. 4, the control information group carried in the first control channel sent by the network device includes the control information respectively corresponding to the uplink channels in the uplink channel group #A and the uplink channel group #B. When the uplink channels in the uplink channel group #A and the uplink channel group #B include channels configured by the network device for the UE 1, the UE 2, the UE 3, the UE 4, the UE 5, the UE 6, the UE 7, and the UE 8 and used to transmit UL grant free uplink data, because reference signals configured for the UE 1 and the UE 5 and used to send uplink data are the same, the UE 1 and the UE 5 cannot respectively determine positions of the control information of the UE 1 and the UE 5 in the control information group based on L=f (s_id).

When the first control channel is sent on a network device side, the control information group carried in the first control channel also needs to be placed at a corresponding position. For example, the network device determines the position of the control information for the first uplink channel in the control information group based on the second basic information of the first uplink channel.

Operation 230: The terminal device performs uplink communication with the network device based on the first control information.

Through operation 210 and operation 220, the terminal device obtains the control information (namely, the first control information) sent by the network device for the terminal device. In operation 230, the terminal device determines, based on the content of the first control information, how to perform the uplink communication with the network device subsequently.

In this embodiment of the present disclosure, the first control information includes at least one of HARQ response information, transmit power adjustment value information, and beam configuration information.

The beam configuration information includes at least one of a quasi co-location (QCL) indicator, transmit beam information, information about a pair of transmit and receive beams, and the like. Alternatively, the beam configuration information includes a reference signal index and at least one of the following information corresponding to the reference signal index: reference signal received power (RSRP), reference signal received quality (RSRQ), a rank indication (RI), and a channel quality indicator (CQI).

Processes of uplink communication between the terminal device and the network device when the first control information is specifically different types of information are described in detail below.

Case 1

The first control information is the HARQ response information.

In this embodiment of the present disclosure, further, the HARQ response information may be at least one of HARQ discontinuous transmission state information, HARQ acknowledgement state information, and HARQ negative acknowledgement state information.

(1) The first control information is the HARQ acknowledgement state information (namely, an ACK).

In one embodiment, in an embodiment, the first uplink channel carries first uplink data, and that the terminal device performs uplink communication with the network device based on the first control information includes:

when the terminal device determines that the first control information is the HARQ acknowledgement state information, stopping, by the terminal device, sending, to the network device, a transport block corresponding to the first uplink data.

In this embodiment, after the UE sends, to the network device in a time unit #1, the first uplink channel carrying the first uplink data, if the UE receives the HARQ acknowledgement state (namely, ACK) information fed back by the network device, it indicates that the network device detects the first uplink channel sent by the UE and correctly decodes the first uplink data carried in the first uplink channel. Therefore, the terminal device stops sending, to the network device, the transport block corresponding to the first uplink data. If the UE still needs to continue to send uplink data, the terminal device sends new uplink data (namely, second uplink data) to the network device in a time unit #2. The time unit #2 is located after the time unit #1 in a chronological order. The second uplink data and the first uplink data correspond to different transport blocks.

On the network device side, if it is determined that the first uplink data is correctly obtained, the first control information in the first control channel sent to the terminal device is the ACK information. After sending the first control channel, the network device may receive, on the first uplink channel configured for the terminal device, the second uplink data sent by the terminal device, where the second uplink data and the first uplink data correspond to different transport blocks.

It should be understood that, if the terminal device sends new uplink data, it may be considered that the new uplink data is sent on a second uplink channel. Positions of a time-domain position and a frequency-domain position of the second uplink channel in a subframe or a radio frame correspond to positions of a time-domain position and a frequency-domain position of the first uplink channel in a subframe or a radio frame.

In addition, the time unit (such as the time unit #1 or the time unit #2) described herein may be one subframe, one slot, one mini-slot, one symbol, or the like. Alternatively, one time unit may be a plurality of subframes, a plurality of slots, a plurality of mini-slots, or a plurality of symbols. When the time unit includes a plurality of slots, the plurality of slots may be consecutive slots in time, or may be inconsecutive slots. This is not particularly limited in this embodiment of the present disclosure. A time unit appearing below is similar to this, and details are not described again.

(2) The first control information is the HARQ negative acknowledgement state (namely, NACK) information.

In one embodiment, in an embodiment, the first uplink channel carries first uplink data, and that the terminal device performs uplink communication with the network device based on the first control information includes:

when the terminal device determines that the first control information is the HARQ negative acknowledgement state information, performing, by the terminal device, at least one of the following operations:

re-sending, by the terminal device to the network device, a transport block corresponding to the first uplink data;

reducing, by the terminal device, a count value of repeated transmissions of the transport block corresponding to the first uplink data by 1; and sending, by the terminal device to the network device by using second transmit power, the transport block corresponding to the first uplink data, where the second transmit power is determined according to a first preset rule based on first transmit power, and the first transmit power is transmit power used when the terminal device sends the first uplink channel.

In this embodiment, after the UE sends, to the network device in a time unit #3 by using the first transmit power, the first uplink channel carrying the first uplink data, if the UE receives the HARQ negative acknowledgement state (namely, NACK) information fed back by the network device, it indicates that the network device detects the first uplink channel sent by the UE but does not correctly decode the first uplink data carried in the first uplink channel. In this case, the UE may re-send the first uplink data to the network device in a time unit #4 by using the second transmit power. The time unit #4 is located after the time unit #3 in a chronological order.

Herein, the second transmit power is determined by the UE according to the first preset rule based on the first transmit power, and the first transmit power is transmit power used when the UE sends the first uplink channel in the time unit #3.

It may be understood that, when sending the first uplink data in the time unit #3, the UE cannot obtain a transmit power adjustment value determined by the network device. Therefore, the UE determines the first transmit power based on a path loss measured by the UE, a data amount of to-be-sent uplink data, historical experience, and the like, to send the first uplink data. After receiving a NACK feedback sent by the network device, the UE needs to re-send the first uplink data. To improve reliability of receiving the first uplink data by the network device, the UE can increase transmit power.

Specifically, the second transmit power may be determined based on the first transmit power according to a preset rule (namely, the first preset rule). A relationship satisfied by the first transmit power and the second transmit power in the first preset rule may be linear or nonlinear. A specific form of the first preset rule is not limited in this embodiment of the present disclosure.

For example, the first preset rule may be transmit power used for the $(N+1)^{th}$ time, and is 3 dB higher than transmit power used for the $N^{th}$ time, where N+1 is less than a preset quantity K of repeated transmissions. Alternatively, transmit power used for the $(N+1)^{th}$ time is P dB higher than transmit power used for the $N^{th}$ time, where $P=M \times (N-1)$.

In addition, the terminal device may reduce the count value of repeated transmissions of the transport block corresponding to the first uplink data by 1.

To ensure sending accuracy of the uplink data, usually, the network device configures the UE to send the uplink data repeatedly K times. Therefore, an initial value of a repeated transmission counter is K, where K is a positive integer greater than or equal to 2. When the terminal device obtains that the first control information for the terminal device is a NACK, it indicates that the transport block corresponding to the uplink data fails to be sent. Therefore, the terminal device reduces the value of K by 1, and continues to send the transport block that is not correctly received by the network device.

It should be noted that, the time unit #3 and the time unit #4 in this embodiment have no relationship with the time unit #1 and the time unit #2 in the foregoing embodiment in a chronological order, and two time units in a chronological order are merely distinguished in respective embodiments.

On the network device side, if it is determined that the first uplink data is detected but the first uplink data is not correctly obtained through demodulation, the first control information in the first control channel sent to the terminal device is the NACK information. After sending the first control channel, the network device may receive, on the first uplink channel configured for the terminal device, second uplink data sent by the terminal device, where the second uplink data and the first uplink data correspond to a same transport block. Power used by the second uplink data sent by the terminal device is the second transmit power, and the second transmit power is determined according to the first preset rule based on the first transmit power.

(3) The first control information is the HARQ discontinuous transmission state information.

In one embodiment, in an embodiment, the first uplink channel carries first uplink data, and that the terminal device performs uplink communication with the network device based on the first control information includes:

when the terminal device determines that the first control information is the HARQ discontinuous transmission state information, performing, by the terminal device, at least one of the following operations:

sending, by the terminal device to the network device, a transport block corresponding to the first uplink data;

keeping, by the terminal device, a count value of repeated transmissions of the transport block corresponding to the first uplink data unchanged; and sending, by the terminal device to the network device by using third transmit power, the transport block corresponding to the first uplink data, where the third transmit power is determined according to a second preset rule based on first transmit power, and the first transmit power is transmit power used when the terminal device sends the first uplink channel.

In this embodiment, after the UE sends, to the network device by using the first transmit power in a time unit #5, the first uplink channel carrying the first uplink data, if the UE receives the HARQ discontinuous transmission state (namely, DTX) information fed back by the network device, it indicates that the network device does not detect the first uplink channel sent by the UE. Certainly, the first uplink data cannot be obtained. In this case, the UE re-sends the first uplink data to the network device in a time unit #6 by using the third transmit power.

Herein, the third transmit power is determined by the UE based on the first transmit power according to the second preset rule. A process of determining the third transmit power based on the first transmit power according to the second preset rule is similar to determining of the second transmit power based on the first transmit power according to the first preset rule above. Details are not described herein again.

It should be noted that, the second preset rule may be the same as or different from the first preset rule. For example, the UE may use a same preset rule during each data retransmission, and determine, based on transmit power used when uplink data is sent for the previous time, transmit power used during current repeated transmission. Alternatively, the UE may use different preset rules during all repeated transmissions of uplink data. This is not limited in the present disclosure.

Similarly, because the network device does not detect the uplink channel sent by the terminal device, the terminal device may keep the count value of repeated transmissions of the transport block corresponding to the first uplink data unchanged.

The foregoing cases (1), (2), and (3) are described below with reference to FIG. 5 and FIG. 6 by using examples.

First, it is assumed that the control information group includes four fields of control information, the control information group includes 8 bits in total, and each piece of control information occupies 2 of the 8 bits. UEs that send uplink data by using uplink channels (respectively denoted as an uplink channel #1 to an uplink channel #4) configured by the network device and corresponding to the four pieces of control information are respectively denoted as UE 1 to UE 4. Reference signals configured by the network device for the UE 1 to the UE 4 are respectively an RS 1, an RS 2, an RS 3, and an RS 4. In addition, the RS 1, the RS 2, the RS 3, and the RS 4 are orthogonal to each other.

In this way, a distribution format of the control information group carried in the first control channel sent by the network device is shown in FIG. 5. FIG. 5 shows an example of a control information group according to the present disclosure.

To ensure sending accuracy of the UL grant free uplink data, usually, the network device configures the UE to repeatedly send the UL grant free uplink data K times, where K≥2 and is a positive integer It is assumed that K configured by the network device is 5. In other words, the UE 1, the UE 2, the UE 3, and the UE 4 each repeatedly send the UL grant free uplink data five times.

Figure 6:
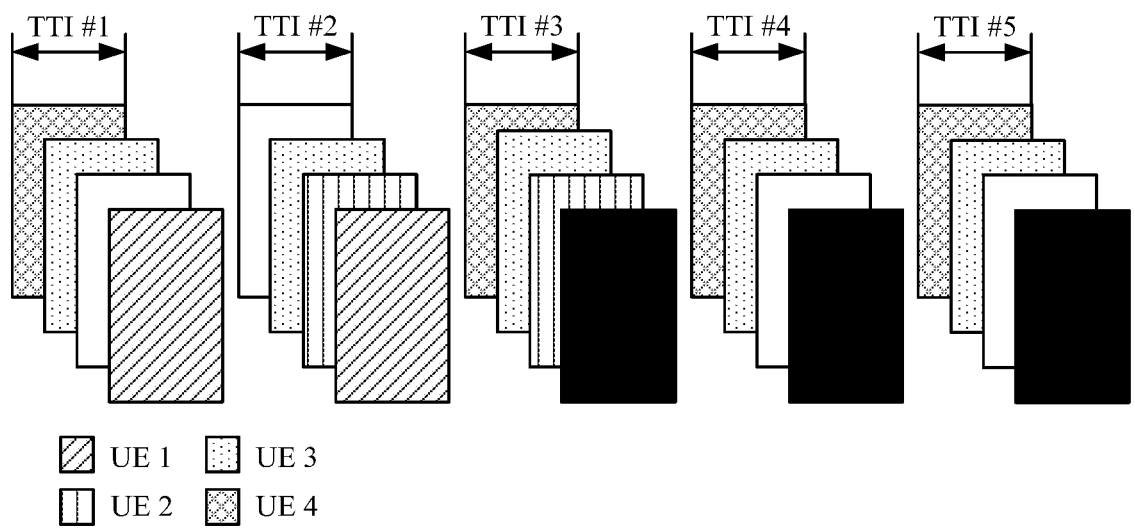
FIG. 6 is a schematic diagram of a process of sending uplink data by a plurality of UEs.

FIG. 6 is a schematic diagram of a process of sending uplink data by UE. Referring to FIG. 6, a TTI #1, a TTI #2, a TTI #3, a TTI #4, and a TTI #5 are consecutive time units or inconsecutive time units. Starting from the TTI #1, the UE 1, the UE 3, and the UE 4 send UL grant free uplink data on uplink channels respectively allocated by the network device to the UE 1, the UE 3, and the UE 4. Transport blocks corresponding to the UL grant free uplink data respectively sent by the UE 1, the UE 3, and the UE 4 are respectively denoted as TB1_UE1, TB1_UE3, and TB1_UE4. Starting from the TTI #2, the UE 2 sends UL grant free uplink data, and the sent UL grant free uplink data is denoted as TB1_UE2.

At the TTI #1, the network device determines that the configured uplink channel #2 used to send UL grant free uplink data is not detected. In this case, the network device sends "DTX" information on a corresponding field (a field #2 in FIG. 5) in the control information group.

The network device receives (or detects) the configured uplink channel #1 used to send UL grant free uplink data, but incorrectly demodulates the UL grant free uplink data that is sent by the UE 1 on the uplink channel #1. In this case, the network device sends "NACK" information on a corresponding field (a field #1 in FIG. 5) in the control information group.

The network device receives the configured uplink channel #4 used to send UL grant free uplink data, and correctly demodulates the uplink data carried in the uplink channel #4. In this case, the network device sends "ACK" information on a corresponding field (a field #4 in FIG. 5) in the control information group.

It is assumed that the UE 3 sends UL grant free uplink data at the TTI #1, but the network device does not detect, at the TTI #1, the configured uplink channel #3 used to send UL grant free uplink data. In this case, the network device sends "DTX" information on a corresponding field (a field #3 in FIG. 5) in the control information group.

Therefore, after obtaining 8-bit control information from the control information group carried in the first control channel, the UE 1 to the UE 4 respectively obtain, from the 8-bit control information, 2-bit fields respectively belonging to the UE 1 to the UE 4. The 2-bit fields are respectively a NACK, DTX, DTX, and an ACK.

If the UE 1 obtains a NACK fed back by the network device, the UE repeatedly sends TB1_UE1, and further needs to send TB1_UE1 four times based on the preset quantity 5 of repetitions.

The UE 2 does not send UL grant free uplink data at the TTI #1, and therefore may not detect the first control channel.

The UE 3 receives DTX fed back by the network device, and determines that the network device does not detect, at the TTI #1, UL grant free uplink data sent by the UE 3. The UE 3 may re-send TB1_UE3. In addition, because the UL grant free uplink data sent by the UE #3 at the TTI #1 is invalid, TB1_UE3 needs to be repeatedly sent five times subsequently.

The UE 4 receives an ACK fed back by the network device, and if the UE 4 still needs to send uplink data, the UE 4 may send new uplink data such as TB2 UE4 subsequently. If the UE 4 does not need to send uplink data, the UE 4 may stop sending UL grant free uplink data.

Case 2

The first control information is the transmit power adjustment value information.

When the first control information is specifically the transmit power adjustment value information, it indicates that the network device does not correctly receive or does not receive the uplink data sent by the terminal device. Therefore, depending on whether the terminal device has sent the first uplink channel to the network device before receiving the first control channel, the terminal device may re-determine, by using different methods, transmit power used when the uplink communication is performed with the network device.

(1) The terminal device has sent the first uplink channel to the network device before receiving the first control channel.

In one embodiment, in an embodiment, that the terminal device performs uplink communication with the network device based on the first control information includes:

when the terminal device determines that the first control information is the transmit power adjustment value TPC information, performing, by the terminal device, at least one of the following operations:

re-sending, by the terminal device to the network device, a transport block corresponding to first uplink data;

reducing, by the terminal device, a count value of repeated transmissions of the transport block corresponding to the first uplink data by 1; and sending, by the terminal device to the network device by using fourth transmit power, the transport block corresponding to the first uplink data, where the fourth transmit power is determined based on the transmit power adjustment value information.

In this embodiment of the present disclosure, after the terminal device sends, to the network device in a time unit #7 by using first transmit power, the first uplink channel carrying the first uplink data, if the terminal device receives the transmit power adjustment value information fed back by the network device, it implicitly indicates that the network device detects the first uplink channel sent by the terminal device, but does not correctly decode the first uplink data carried in the first uplink channel. In this case, the terminal device may determine the fourth transmit power based on the transmit power adjustment value information indicated by the first control information, and re-send the first uplink data to the network device in a time unit #8 by using the fourth transmit power. The time unit #8 is located after the time unit #7 in a chronological order. Alternatively, the terminal device may determine the fourth transmit power based on the first transmit power and the transmit power adjustment value information indicated by the first control information, and re-send the first uplink data to the network device in a time unit #8 by using the fourth transmit power. The time unit #8 is located after the time unit #7 in a chronological order.

In addition, the terminal device may further reduce a count value of repeated transmissions of the transport block corresponding to the first uplink data by 1.

It should be understood that, the time unit #5 and the time unit #6 in the foregoing embodiment have a relative chronological order, but there is no chronological order between the time unit #1 to the time unit #4 and either of the time unit #5 and the time unit #6. Similarly, the time unit #7 and the time unit #8 have a relative chronological order, but there is no chronological order between the time unit #1 to the time unit #6 and either of the time unit #7 and the time unit #8.

On the network device side, if it is determined that the first uplink data is detected but the first uplink data is not correctly obtained through demodulation, the first control information in the first control channel sent to the terminal device is TPC information. After sending the first control channel, the network device may receive, on the first uplink channel configured for the terminal device, second uplink data sent by the terminal device, where the second uplink data and the first uplink data correspond to a same transport block. Power used by the second uplink data sent by the terminal device is the fourth transmit power, and the fourth transmit power is determined based on the TPC information indicated by the first control information.

(2) The terminal device has not sent the first uplink channel to the network device before receiving the first control channel.

In one embodiment, in an embodiment, that the terminal device performs uplink communication with the network device based on the first control information includes:

when the terminal device determines that the first control information is the power adjustment value information, sending, by the terminal device, the first uplink channel to the network device by using fifth transmit power, where the fifth transmit power is determined by the terminal device according to a third preset rule based on the transmit power adjustment value information.

If the terminal device has not sent an uplink channel to the network device but receives the power adjustment value information sent by the network device, when needing to send uplink data subsequently, the terminal device may determine fourth transmit power according to the preset third preset rule based on the transmit power adjustment value information, and send the uplink data to the network device by using the fourth transmit power.

It may be understood that, the third preset rule herein may be the same as or different from either of the first preset rule and the second preset rule described above. A specific form of the third preset rule is not particularly limited in this embodiment of the present disclosure.

In this embodiment of the present disclosure, the network device and the terminal device may pre-agree on information indicated by different values of N bits forming the control information. An example in which the control information group includes four fields of control information, and each field of control information has 2 bits is still used.

Table 2 shows an example of a correspondence between each piece of control information in the control information group and information indicated by the control information.

TABLE 2

| Control information | Transmit power adjustment value (dB) |
|---|---|
| 00 | Default |
| 01 | Power adjustment value 1 |
| 10 | Power adjustment value 2 |
| 11 | Power adjustment value 3 |

"Default" in Table 2 indicates that the transmit power adjustment value is 0, in other words, no power adjustment is required.

The network device and the terminal device may pre-agree on information indicated by 2 bits of each field in the control information group. In this way, after obtaining a value of 2 bits in the control information group that belong to the terminal device, the terminal device may understand information indicated by the value of the 2 bits.

The transmit power adjustment value herein may be sent by the network device to the terminal device after the network device receives, on the uplink channel configured for the terminal device, the uplink data sent by the terminal device, or may be sent when the network device does not receive any uplink channel configured for the terminal device.

Case 3

The first control information is the HARQ response information and the transmit power adjustment value information.

Similarly, information indicated by each piece of control information in the control information group may be pre-agreed on by the network device and the terminal device.

It may be understood that, because the HARQ response information specifically includes at least one of the HARQ discontinuous transmission state information, the HARQ acknowledgement state information, and the HARQ negative acknowledgement state information, content of the control information has many forms.

An example in which each piece of control information has 2 bits is still used. Information indicated by the control information may be shown in Table 3.

TABLE 3

| Control information | HARQ response information and transmit power adjustment value information (dB) |
|---|---|
| 00 | DTX |
| 01 | 1 dB |
| 10 | 3 dB |
| 11 | ACK |

It should be understood that, when the value of the 2 bits of the control information is specifically "01" and "10", it implicitly indicates that the HARQ response information is specifically a negative acknowledgement NACK state.

The uplink communication method provided in the present disclosure is described in detail above with reference to FIG. 1 to FIG. 6. A terminal device and a network device provided in the present disclosure are described below with reference to FIG. 7 to FIG. 10.

Figure 7:
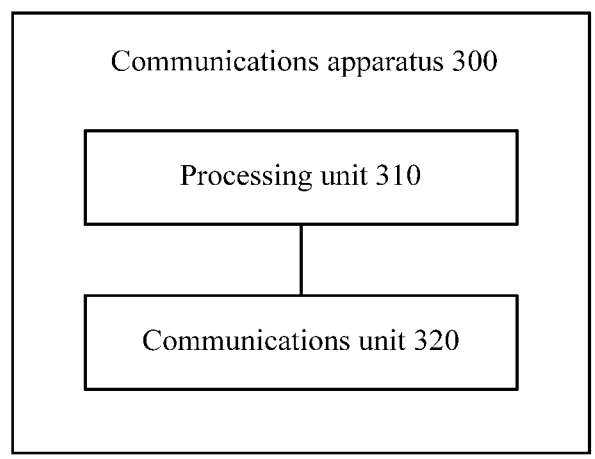
FIG. 7 is a schematic block diagram of a terminal device 300 according to an embodiment of the present disclosure.

FIG. 7 is a schematic block diagram of a communications apparatus 300 according to an embodiment of the present disclosure. Referring to FIG. 7, the communications apparatus 300 includes:

a processing unit 310, configured to obtain a first control channel, where the first control channel carries a control information group, the control information group includes a plurality of pieces of control information, and the plurality of pieces of control information correspond to a plurality of uplink channels, where the processing unit 310 is further configured to obtain first control information from the first control channel, where the first control information is control information corresponding to a first uplink channel in the plurality of uplink channels; and a communications unit 320, configured to perform uplink communication with a network device based on the first control information.

The units and the foregoing other operations or functions of the communications apparatus 300 provided in this embodiment of the present disclosure are respectively for implementing corresponding procedures performed by the terminal device in the uplink communication method 200 provided in the embodiments of the present disclosure. For brevity, details are not described herein again.

Figure 8:
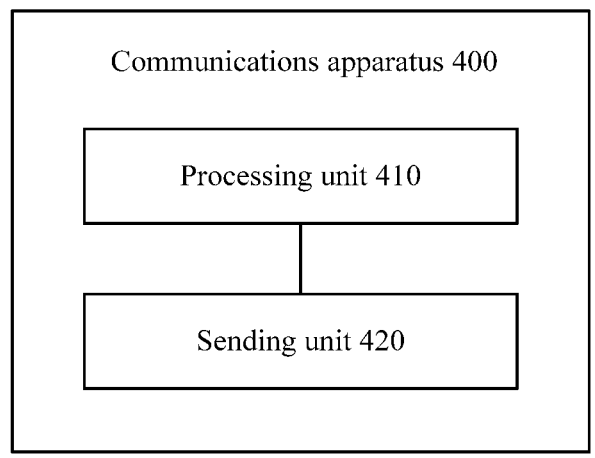
FIG. 8 is a schematic block diagram of a network device 400 according to an embodiment of the present disclosure.

FIG. 8 is a schematic block diagram of a communications apparatus 400 according to an embodiment of the present disclosure. Referring to FIG. 8, the communications apparatus 400 includes:

a processing unit 410, configured to determine a control information group, where the control information group includes a plurality of pieces of control information, the plurality of pieces of control information correspond to a plurality of uplink channels, the plurality of pieces of control information include first control information, and the first control information is control information corresponding to a first uplink channel in the plurality of uplink channels; and a sending unit 420, configured to send a first control channel, where the first control channel carries the control information group.

The units and the foregoing other operations or functions of the communications apparatus 400 provided in the present disclosure are respectively for implementing corresponding procedures performed by the network device in the uplink communication method 200 provided in the present disclosure. For brevity, details are not described herein again.

Figure 9:
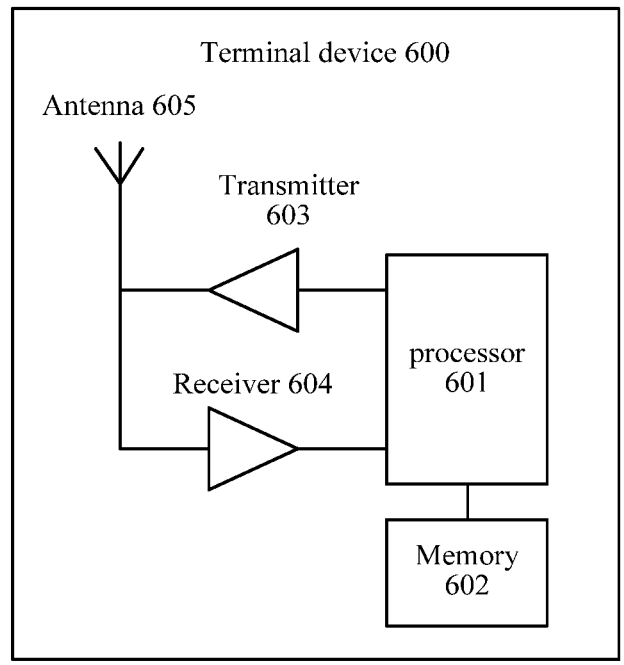
FIG. 9 is a schematic structural diagram of a terminal device 600 according to an embodiment of the present disclosure.

FIG. 9 is a schematic structural diagram of a terminal device 600 according to an embodiment of the present disclosure. As shown in FIG. 9, the terminal device 600 includes one or more processors 601, one or more memories 602, and one or more transceivers (each transceiver includes a transmitter 603 and a receiver 604). The transmitter 603 or the receiver 604 is connected to one or more antennas 605, and sends or receives a signal through the antenna. The memory 602 stores a computer program instruction (or code). The processor 601 executes the computer program instruction stored in the memory 602, to implement a corresponding procedure and/or operation performed by the terminal device in the uplink communication method 200 provided in the embodiments of the present disclosure. For brevity, details are not described herein again.

It should be noted that, the communications apparatus 300 shown in FIG. 7 may be implemented by the terminal device 600 shown in FIG. 9. For example, the processing unit 310 shown in FIG. 7 may be implemented by the processor 601, and the communications unit 320 (which is specifically a sending unit) may be implemented by the transmitter 603.

Figure 10:
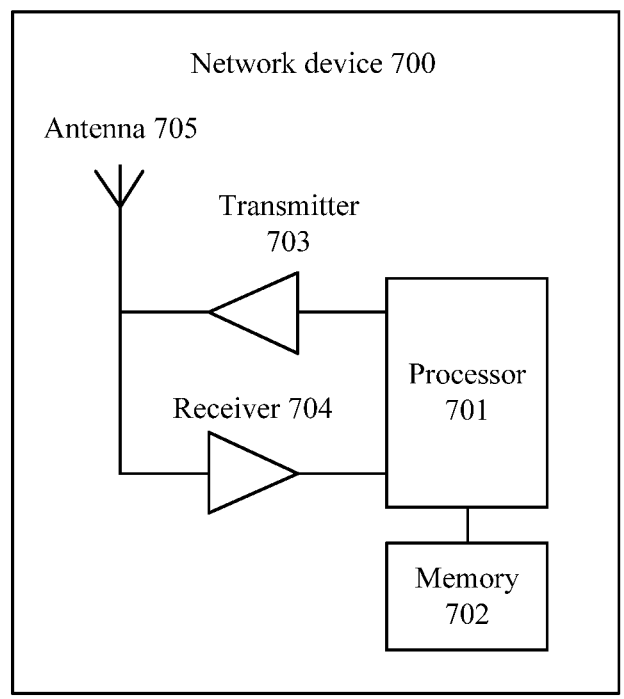
FIG. 10 is a schematic structural diagram of a network device 700 according to an embodiment of the present disclosure.

FIG. 10 is a schematic structural diagram of a network device 700 according to an embodiment of the present disclosure. As shown in FIG. 10, the network device 700 includes one or more processors 701, one or more memories 702, and one or more transceivers (each transceiver includes a transmitter 703 and a receiver 704). The transmitter 703 or the receiver 704 is connected to one or more antennas 705, and sends or receives a signal through the antenna. The memory 702 stores a computer program instruction (or code). The processor 701 executes the computer program instruction stored in the memory 702, to implement a corresponding procedure and/or operation performed by the network device in the uplink communication method 200 provided in the embodiments of the present disclosure. For brevity, details are not described herein again.

Similarly, the communications apparatus 400 shown in FIG. 8 may be implemented by the network device 700 shown in FIG. 10. For example, the processing unit 410 shown in FIG. 8 may be implemented by the processor 701, and the sending unit 420 may be implemented by the transmitter 703 shown in FIG. 10.

In the foregoing embodiments, the processor may be a central processing unit (CPU), a microprocessor, an application-specific integrated circuit (ASIC), or one or more integrated circuits configured to control execution of a program in the solutions provided in the present disclosure. For example, the processor may include a digital signal processor device, a microprocessor device, an analog-to-digital converter, or a digital-to-analog converter. The processor may allocate control and signal processing functions of a mobile device between these devices based on respective functions of these devices. Additionally, the processor may include a function of operating one or more software programs, and the software programs may be stored in the memory.

The memory may be a read-only memory (ROM) or another type of static storage device that can store static information and a static instruction, or a random access memory (RAM) or another type of dynamic storage device that can store information and an instruction, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, or the like), a magnetic disk storage medium or another magnetic storage device, or any other medium that can be configured to carry or store desired program code in the form of an instruction or a data structure and that is accessible to a computer, but is not limited thereto. The memory may independently exist, or may be integrated with the processor.

The transceiver may include, for example, an infrared transceiver, a transceiver, a wireless universal serial bus (USB) transceiver, or a Bluetooth transceiver. Although not shown, the terminal device and the network device may send information (or a signal) through the transmitter by using a corresponding communications technology, and/or receive information (a signal) through the receiver.

In addition, an embodiment of the present disclosure provides a computer program product. The computer program product includes computer program code, and when the computer program code runs on a computer, the computer is enabled to perform a corresponding procedure and/or operation performed by the terminal device in the method embodiments of the present disclosure.

In addition, an embodiment of the present disclosure provides a computer program product. The computer program product includes computer program code, and when the computer program code runs on a computer, the computer is enabled to perform a corresponding procedure and/or operation performed by the network device in the method embodiments of the present disclosure.

In addition, an embodiment of the present disclosure provides a chip system. The chip system includes a processor, configured to implement a function of the terminal device in the embodiments of the present disclosure, for example, receiving or processing a signal and/or information in the method embodiments. In one embodiment, the chip system further includes a memory, and the memory is configured to store a program instruction and data for the terminal device. The chip system may include a chip, or may include a chip and another discrete component.

In addition, an embodiment of the present disclosure provides a chip system. The chip system includes a processor, configured to implement a function of the network device in the embodiments of the present disclosure, for example, receiving or processing a signal and/or information in the method embodiments. In one embodiment, the chip system further includes a memory, and the memory is configured to store a program instruction and data for the network device. The chip system may include a chip, or may include a chip and another discrete component.

A person of ordinary skill in the art may be aware that, in combination with the examples described in the embodiments disclosed in this specification, units and algorithm operations can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in the present disclosure, it should be understood that the disclosed system, apparatus, and method may be implemented in other manners. For example, the described apparatus embodiment is merely an example. For example, the unit division is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An uplink communication method, comprising:
obtaining, by a terminal device, a first control channel, wherein the first control channel carries a control information group, the control information group comprises a plurality of pieces of control information, and the plurality of pieces of control information correspond to a plurality of uplink channels that carry uplink data;

obtaining, by the terminal device, first control information from the first control channel, wherein the first control information is control information corresponding to a first uplink channel in the plurality of uplink channels; and performing, by the terminal device, uplink communication with a network device based on the first control information, wherein a position of the first control information in the control information group corresponds to second basic information of the first uplink channel in the plurality of uplink channels.

2. The method according to claim 1, further comprising:
receiving, by the terminal device, configuration information sent by the network device, wherein
the configuration information is used to indicate at least one of a time-domain position occupied by the first uplink channel, a frequency-domain position occupied by the first uplink channel, or a reference signal used when the terminal device performs uplink communication on the first uplink channel; or
the configuration information is used to indicate a sequence number of the first uplink channel in the plurality of uplink channels or an index of the first uplink channel; or
the configuration information comprises group identifier information of the terminal device, and the group identifier information corresponds to the first uplink channel.

3. The method according to claim 2, further comprising:
obtaining, by the terminal device, the first uplink channel based on the configuration information.

4. The method according to claim 1, wherein
the control information group comprises a plurality of bits, the plurality of bits include a plurality of bit sets, each bit set comprises at least one bit, and each bit set is used to indicate one of the plurality of pieces of control information; or
the control information group comprises a plurality of bits, the plurality of bits comprise M valid values, and each valid value corresponds to a combination of the plurality of pieces of control information.

5. The method according to claim 1, wherein the second basic information comprises at least one of a time-domain position occupied by the first uplink channel, a frequency-domain position occupied by the first uplink channel, or a reference signal used when the terminal device performs the uplink communication on the first uplink channel.

6. The method according to claim 1, wherein the first control information comprises at least one of hybrid automatic repeat request (HARQ) response information, transmit power adjustment value information, or beam configuration information.

7. An uplink communication method, comprising:
determining, by a network device, a control information group, wherein the control information group comprises a plurality of pieces of control information, the plurality of pieces of control information correspond to a plurality of uplink channels that carry uplink data, the plurality of pieces of control information comprise first control information, and the first control information is control information corresponding to a first uplink channel in the plurality of uplink channels; and sending, by the network device, a first control channel, wherein the first control channel carries the control information group, wherein a position of the first control information in the control information group corresponds to second basic information of the first uplink channel in the plurality of uplink channels.

8. The method according to claim 7, further comprising:
sending, by the network device, configuration information to a terminal device, wherein
the configuration information is used to indicate at least one of a time-domain position occupied by the first uplink channel, a frequency-domain position occupied by the first uplink channel, or a reference signal used when the terminal device performs uplink communication on the first uplink channel; or
the configuration information is used to indicate a sequence number of the first uplink channel in the plurality of uplink channels or an index of the first uplink channel; or
the configuration information comprises group identifier information of the terminal device, and the group identifier information corresponds to the first uplink channel.

9. The method according to claim 7, wherein
the control information group comprises a plurality of bits, the plurality of bits include a plurality of bit sets, each bit set comprises at least one bit, and each bit set is used to indicate one of the plurality of pieces of control information; or
the control information group comprises a plurality of bits, the plurality of bits comprise M valid values, and each valid value corresponds to a combination of the plurality of pieces of control information.

10. The method according to claim 7, wherein the first control channel carries identifier information of the first control channel.

11. The method according to claim 7, wherein the second basic information comprises at least one of a time-domain position occupied by the first uplink channel, a frequency-domain position occupied by the first uplink channel, or a reference signal used when a terminal device performs uplink communication on the first uplink channel.

12. The method according to claim 7, wherein the first control information comprises at least one of hybrid automatic repeat request (HARQ) response information, transmit power adjustment value information, or beam configuration information.

13. A terminal device, comprising:
a processor, configured to obtain a first control channel, wherein the first control channel carries a control information group, the control information group comprises a plurality of pieces of control information, and the plurality of pieces of control information correspond to a plurality of uplink channels, wherein
the processor is further configured to obtain first control information from the first control channel, wherein the first control information is control information corresponding to a first uplink channel in the plurality of uplink channels that carry uplink data; and
a transceiver, configured to perform uplink communication with a network device based on the first control information,
wherein a position of the first control information in the control information group corresponds to second basic information of the first uplink channel in the plurality of uplink channels.

14. The terminal device according to claim 13, wherein before the processor obtains the first control channel, the transceiver is further configured to send a signal to the network device by using the first uplink channel.

15. The terminal device according to claim 13, wherein the first control channel carries information obtained after joint coding is performed on the plurality of pieces of control information.

16. The terminal device according to claim 13, wherein the transceiver is further configured to receive configuration information sent by the network device, wherein
the configuration information is used to indicate at least one of a time-domain position occupied by the first uplink channel, a frequency-domain position occupied by the first uplink channel, or a reference signal used when the terminal device performs uplink communication on the first uplink channel; or
the configuration information is used to indicate a sequence number of the first uplink channel in the plurality of uplink channels or an index of the first uplink channel; or
the configuration information comprises group identifier information of the terminal device, and the group identifier information corresponds to the first uplink channel.

17. The terminal device according to claim 16, wherein the processor is further configured to obtain the first uplink channel based on the configuration information.

18. The terminal device according to claim 13, wherein
the control information group comprises a plurality of bits, the plurality of bits include a plurality of bit sets, each bit set comprises at least one bit, and each bit set is used to indicate one of the plurality of pieces of control information; or
the control information group comprises a plurality of bits, the plurality of bits comprise M valid values, and each valid value corresponds to a combination of the plurality of pieces of control information.

19. The terminal device according to claim 13, wherein the second basic information comprises at least one of a time-domain position occupied by the first uplink channel, a frequency-domain position occupied by the first uplink channel, or a reference signal used when the terminal device performs the uplink communication on the first uplink channel.

20. The terminal device according to claim 13, wherein the first control information comprises at least one of hybrid automatic repeat request (HARQ) response information, transmit power adjustment value information, or beam configuration information.

* * * * *